US010776754B2

(12) United States Patent
Marth et al.

(10) Patent No.: US 10,776,754 B2
(45) Date of Patent: Sep. 15, 2020

(54) CONTENT CREATION, DEPLOYMENT COLLABORATION, AND SUBSEQUENT MARKETING ACTIVITIES

(71) Applicant: Adobe Inc., San Jose, CA (US)

(72) Inventors: Michael A. Marth, Basel-Stadt (CH); Ken Beaton, Ottawa (CA)

(73) Assignee: Adobe Inc., San Jose, CA (US)

( * ) Notice: Subject to any disclaimer, the term of this patent is extended or adjusted under 35 U.S.C. 154(b) by 488 days.

(21) Appl. No.: 14/630,402

(22) Filed: Feb. 24, 2015

(65) Prior Publication Data
US 2016/0148278 A1 May 26, 2016

Related U.S. Application Data

(60) Provisional application No. 62/085,040, filed on Nov. 26, 2014.

(51) Int. Cl.
G06Q 30/00 (2012.01)
G06Q 10/10 (2012.01)
(Continued)

(52) U.S. Cl.
CPC ....... *G06Q 10/101* (2013.01); *G06Q 30/0243* (2013.01); *G06Q 30/0246* (2013.01);
(Continued)

(58) Field of Classification Search
CPC . G06Q 30/0277; G06Q 30/0269; G06Q 30/02
See application file for complete search history.

(56) References Cited

U.S. PATENT DOCUMENTS 7,028,079 B2 * 4/2006 Mastrianni ............... G06F 8/60
707/999.202
7,260,551 B2 8/2007 Phillips
(Continued)

FOREIGN PATENT DOCUMENTS

CN 1996298 7/2007
CN 101212304 7/2008
(Continued)

OTHER PUBLICATIONS

Matellanes; An Architecture for Multimedia Content Management; ISO/IEC, pp. 127-132; 2007.*
(Continued)

*Primary Examiner* — Radu Andrei
(74) *Attorney, Agent, or Firm* — SBMC

(57) ABSTRACT

Content creation and deployment collaboration techniques are described. In one or more implementations, metadata that describes the creation of the content may be associated with the content. The content may then be provided from a content creation service to a content deployment service for deployment as part of a marketing activity. Deployment data obtained from this tracking may be utilized to support a variety of functionality, such as by content creators to determine which of their content has been successfully employed as part of marketing activities, marketers may also use knowledge of the deployment of the content to choose content to be included in a marketing activity as well as select content creators that are best suited to provide this content, used to configure badges, by retailers and manufacturers, and so forth.

20 Claims, 35 Drawing Sheets

(51) Int. Cl.
*G06Q 30/02* (2012.01)
*H04L 29/06* (2006.01)

(52) U.S. Cl.
CPC ..... *G06Q 30/0269* (2013.01); *G06Q 30/0276* (2013.01); *G06Q 30/0277* (2013.01); *H04L 63/10* (2013.01)

(56) References Cited

U.S. PATENT DOCUMENTS

| | | | |
|---|---|---|---|
| 7,528,868 B2 | 5/2009 | Perotti et al. | |
| 7,555,165 B2 | 6/2009 | Luo et al. | |
| 7,620,633 B1 | 11/2009 | Parsons et al. | |
| 7,783,635 B2* | 8/2010 | Maes | G06F 16/9535 707/732 |
| 7,941,394 B2 | 5/2011 | Error | |
| 8,086,960 B1* | 12/2011 | Gopalakrishna | G06F 16/986 715/266 |
| 8,346,620 B2* | 1/2013 | King | G06Q 30/02 705/26.1 |
| 8,494,297 B2 | 7/2013 | Zhang et al. | |
| 8,909,925 B2 | 12/2014 | Baskaran | |
| 9,240,049 B2* | 1/2016 | Ciurea | H04N 13/128 |
| 9,396,279 B1* | 7/2016 | O'Donnell | G06F 16/958 |
| 9,524,077 B1* | 12/2016 | Pattan | H04N 21/4826 |
| 9,529,785 B2* | 12/2016 | Vagell | G06F 40/169 |
| 9,635,096 B2* | 4/2017 | Chung | G06F 16/435 |
| 2001/0023436 A1* | 9/2001 | Srinivasan | H04N 21/812 709/219 |
| 2002/0040360 A1* | 4/2002 | Sohma | G06F 16/78 |
| 2004/0019634 A1* | 1/2004 | Van Geldern | G06F 16/23 709/203 |
| 2004/0174434 A1* | 9/2004 | Walker | H04N 5/232 348/211.3 |
| 2005/0076310 A1* | 4/2005 | Tada | G11B 27/34 715/838 |
| 2006/0242135 A1* | 10/2006 | Weare | G06F 16/9535 |
| 2006/0272026 A1* | 11/2006 | Niwano | G06F 21/10 726/27 |
| 2007/0156672 A1* | 7/2007 | Wolff | G06F 16/958 |
| 2007/0180523 A1* | 8/2007 | Jablonski | G06F 21/10 726/22 |
| 2007/0226365 A1* | 9/2007 | Hildreth | H04L 29/06027 709/231 |
| 2007/0255621 A1 | 11/2007 | Mason | |
| 2007/0275705 A1* | 11/2007 | Lau | G06F 16/951 455/414.1 |
| 2008/0163379 A1* | 7/2008 | Robinson | G06F 3/04815 726/27 |
| 2009/0063419 A1* | 3/2009 | Nurminen | G06F 16/1834 |
| 2009/0097748 A1* | 4/2009 | Lee | G06F 16/434 382/173 |
| 2009/0217150 A1* | 8/2009 | Lin | G06F 16/957 715/232 |
| 2010/0146269 A1* | 6/2010 | Baskaran | G06F 21/10 713/165 |
| 2010/0268821 A1* | 10/2010 | Pau | G06F 15/16 709/225 |
| 2011/0008017 A1* | 1/2011 | Gausereide | G11B 27/036 386/280 |
| 2011/0035662 A1* | 2/2011 | King | G06F 40/169 715/273 |
| 2011/0313815 A1* | 12/2011 | Brandstetter | H04N 21/4828 705/7.33 |
| 2011/0320365 A1* | 12/2011 | Gopalakrishnan | G06Q 10/06312 705/301 |
| 2012/0159337 A1* | 6/2012 | Travilla | G06Q 30/0631 715/738 |
| 2012/0284605 A1* | 11/2012 | Sitrick | G06F 17/00 715/230 |
| 2013/0013699 A1* | 1/2013 | Huxley | G06Q 10/101 709/206 |
| 2013/0024418 A1* | 1/2013 | Sitrick | G06F 40/169 707/608 |
| 2013/0173337 A1* | 7/2013 | Evans | G06Q 30/02 705/7.29 |
| 2013/0254713 A1 | 9/2013 | Belsky et al. | |
| 2013/0290840 A1* | 10/2013 | Ogishi | G06K 9/00154 715/268 |
| 2013/0322633 A1* | 12/2013 | Stone | G10L 25/54 381/2 |
| 2013/0332512 A1* | 12/2013 | Roman | G06F 3/0481 709/203 |
| 2014/0019891 A1* | 1/2014 | Borah | G06F 9/445 715/762 |
| 2014/0089322 A1* | 3/2014 | Garcia | G06F 16/9535 707/748 |
| 2014/0101540 A1* | 4/2014 | King | G06F 16/93 715/255 |
| 2014/0149857 A1 | 5/2014 | Vagell et al. | |
| 2014/0249897 A1* | 9/2014 | Znerold | G06Q 30/0241 705/14.4 |
| 2014/0324576 A1 | 10/2014 | van Datta et al. | |
| 2014/0330892 A1* | 11/2014 | Ling | G06F 16/13 709/203 |
| 2015/0052559 A1* | 2/2015 | Leong | H04N 21/482 725/44 |
| 2015/0100578 A1* | 4/2015 | Rosen | G06F 16/9554 707/737 |
| 2015/0331842 A1* | 11/2015 | Costa | G11B 27/034 715/202 |
| 2016/0088352 A1* | 3/2016 | Agarwal | H04N 21/44222 725/12 |
| 2016/0092069 A1* | 3/2016 | Kelly | G07F 17/3223 463/25 |
| 2016/0132194 A1* | 5/2016 | Grue | G06F 16/58 715/810 |
| 2016/0148158 A1 | 5/2016 | Marth et al. | |
| 2016/0148249 A1 | 5/2016 | Marth et al. | |
| 2016/0148277 A1 | 5/2016 | Marth et al. | |
| 2016/0148279 A1 | 5/2016 | Marth et al. | |
| 2016/0148280 A1 | 5/2016 | Marth et al. | |
| 2016/0150537 A1* | 5/2016 | Jung | H04W 4/80 455/452.1 |
| 2016/0267259 A1* | 9/2016 | Seo | G06F 21/16 |
| 2016/0335250 A1* | 11/2016 | Breitenbach | G06F 40/279 |
| 2017/0147836 A1* | 5/2017 | Joscelyne | G06F 21/602 |

FOREIGN PATENT DOCUMENTS

| | | | |
|---|---|---|---|
| CN | 101321306 | 12/2008 | |
| CN | 101373471 | 2/2009 | |
| CN | 101540844 | 9/2009 | |
| CN | 101937469 | 1/2011 | |
| CN | 102043815 | 5/2011 | |
| CN | 102128628 | 7/2011 | |
| CN | 102769634 | 11/2012 | |
| CN | 103329152 | 9/2013 | |
| CN | 103957190 | 7/2014 | |
| CN | 104001329 | 8/2014 | |
| WO | WO-2008033840 | 3/2008 | |
| WO | WO 2008033840 A2 * | 3/2008 | G06Q 10/06 |
| WO | WO-2008033840 A2 * | 3/2008 | G06Q 10/10 |
| WO | WO-2014106237 | 7/2014 | |

OTHER PUBLICATIONS

Sardis; Biopolis, Long Term Preservation of Digital User Content; IEEE 2013; pp. 478-483;m 2013.*
"Combined Search and Examination Report", GB Application No. 1513401.8, dated Jan. 20, 2016, 7 pages.
"Combined Search and Examination Report", GB Application No. 1513403.4, dated Jan. 20, 2016, 7 pages.
"Combined Search and Examination Report", GB Application No. 1513405.9, dated Jan. 20, 2016, 7 pages.
"Combined Search and Examination Report", GB Application No. 1513354.9, dated Jan. 21, 2016, 7 pages.

(56) References Cited

OTHER PUBLICATIONS

"Combined Search and Examination Report", GB Application No. 1513359.8, dated Jan. 21, 2016, 7 pages.
"Combined Search and Examination Report", GB Application No. 1513362.2, dated Jan. 21, 2016, 7 pages.
"Non-Final Office Action", U.S. Appl. No. 14/630,418, dated Jun. 7, 2017, 16 pages.
"Non-Final Office Action", U.S. Appl. No. 14/630,442, dated Jun. 9, 2017, 19 pages.
"Non-Final Office Action", U.S. Appl. No. 14/630,460, dated Jun. 12, 2017, 19 pages.
"Non-Final Office Action", U.S. Appl. No. 14/630,377, dated Jun. 13, 2017, 22 pages.
"Restriction Requirement", U.S. Appl. No. 14/630,377, dated Apr. 19, 2017, 7 pages.
"Restriction Requirement", U.S. Appl. No. 14/630,442, dated Apr. 19, 2017, 7 pages.
"Restriction Requirement", U.S. Appl. No. 14/630,460, dated Apr. 19, 2017, 7 pages.
"Restriction Requirement", U.S. Appl. No. 14/630,618, dated Apr. 19, 2017, 7 pages.
"Non-Final Office Action", U.S. Appl. No. 14/630,342, dated Aug. 17, 2017, 20 pages.
"Final Office Action", U.S. Appl. No. 14/630,418, dated Aug. 23, 2017, 21 pages.
"Final Office Action", U.S. Appl. No. 14/630,460, dated Oct. 30, 2017, 23 pages.
"Final Office Action", U.S. Appl. No. 14/630,377, dated Nov. 2, 2017, 23 pages.
"Final Office Action", U.S. Appl. No. 14/630,442, dated Oct. 19, 2017, 27 pages.
"Foreign Office Action", GB Application No. 1513354.9, dated Dec. 22, 2017, 6 pages.
"Foreign Office Action", GB Application No. 1513359.8, dated Jan. 15, 2018, 6 pages.
"Foreign Office Action", GB Application No. 1513362.2, dated Dec. 22, 2017, 6 pages.
"Foreign Office Action", GB Application No. 1513401.8, dated Dec. 7, 2017, 5 pages.
"Foreign Office Action", GB Application No. 1513403.4, dated Dec. 7, 2017, 5 pages.
"Foreign Office Action", GB Application No. 1513405.9, dated Dec. 7, 2017, 6 pages.
"Non-Final Office Action", U.S. Appl. No. 14/630,342, dated Dec. 27, 2017, 25 pages.
"Final Office Action", U.S. Appl. No. 14/630,342, dated May 2, 2018, 24 pages.
"Final Office Action", U.S. Appl. No. 14/630,442, dated Jun. 14, 2018, 22 pages.
"Non-Final Office Action", U.S. Appl. No. 14/630,377, dated May 15, 2018, 28 pages.
"Non-Final Office Action", U.S. Appl. No. 14/630,418, dated Apr. 20, 2018, 27 pages.
"Non-Final Office Action", U.S. Appl. No. 14/630,442, dated Apr. 11, 2018, 24 pages.
"Non-Final Office Action", U.S. Appl. No. 14/630,460, dated Apr. 11, 2018, 27 pages.
"Final Office Action", U.S. Appl. No. 14/630,460, dated Aug. 27, 2018, 25 pages.
"Final Office Action", U.S. Appl. No. 14/630,377, dated Oct. 18, 2018, 31 pages.
"Final Office Action", U.S. Appl. No. 14/630,418, dated Oct. 16, 2018, 32 pages.
"Examiner's Answer to Appeal Brief", U.S. Appl. No. 14/630,442, dated Nov. 30, 2018, 10 pages.
"Non-Final Office Action", U.S. Appl. No. 14/630,342, dated Dec. 3, 2018, 23 pages.
"Final Office Action", U.S. Appl. No. 14/630,418, dated Oct. 25, 2018, 32 pages.
"Foreign Office Action", GB Application No. 1513401.8, dated Sep. 27, 2018, 5 pages.
"Foreign Office Action", GB Application No. 1513403.4, dated Sep. 27, 2018, 6 pages.
"Foreign Office Action", GB Application No. 1513354.9, dated Sep. 26, 2018, 8 pages.
"Foreign Office Action", GB Application No. 1513359.8, dated Sep. 26, 2018, 8 pages.
"Foreign Office Action", GB Application No. 1513362.2, dated Sep. 26, 2018, 8 pages.
"Foreign Office Action", GB Application No. 1513405.9, dated Sep. 27, 2018, 8 pages.
"Advisory Action", U.S. Appl. No. 14/630,377, dated Mar. 28, 2019, 2 pages.
"Advisory Action", U.S. Appl. No. 14/630,418, dated Mar. 28, 2019, 2 pages.
"Examiner's Answer to Appeal Brief", U.S. Appl. No. 14/630,342, dated May 13, 2019, 21 pages.
"Examiner's Answer to Appeal Brief", U.S. Appl. No. 14/630,377, dated Apr. 15, 2019, 12 pages.
"Examiner's Answer to Appeal Brief", U.S. Appl. No. 14/630,418, dated Apr. 15, 2019, 10 pages.
"Examiner's Answer to Appeal Brief", U.S. Appl. No. 14/630,460, dated Oct. 30, 2019, 12 pages.
"Foreign Office Action (English Translation Unavailable)", CN Application No. 201510837599.9, dated Mar. 3, 2020, 12 pages.
"Foreign Office Action", CN Application No. 201510846967.6, dated Mar. 2, 2020, 13 pages.
"Foreign Office Action", CN Application No. 201510844691.8, dated Mar. 2, 2020, 17 pages.
"Foreign Office Action", CN Application No. 201510846625.4, dated Mar. 4, 2020, 18 pages.
"Foreign Office Action", CN Application No. 201510845521.1, dated Mar. 4, 2020, 19 pages.
"Foreign Office Action", CN Application No. 201510846835.5, dated Mar. 3, 2020, 25 pages.
"Patent Trial and Appeal Board Decision", U.S. Appl. No. 14/630,418, dated Jul. 2, 2020, 10 pages.
"Patent Trial and Appeal Board Decision", U.S. Appl. No. 14/630,442, dated Jul. 1, 2020, 20 pages.
"Patent Trial and Appeal Board Decision", U.S. Appl. No. 14/630,377, dated Jul. 1, 2020, 23 pages.
"Patent Trial and Appeal Board Decision", U.S. Appl. No. 14/630,342, dated Jul. 7, 2020, 25 pages.
"Examination Report", AU Application No. 2015252040, dated Jun. 11, 2020, 4 pages.

* cited by examiner

2900 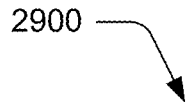

2902
Access a content creation service via a network to create content, the content creation service implemented by one or more computing devices and configured to associate metadata with the content, automatically and without user intervention, that is indicative of characteristics of how the content is created as part of the content creation service

2904
Cause the content to be communicated by the content creation service for deployment by a content deployment service as part of a marketing activity, the content including a usage tracking monitor as part of the deployment that is usable to cause data to be collected that describes the deployment of the content as part of the marketing activity

*Fig. 29*

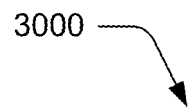

3002
Expose functionality that is accessible to a content creator via a network to create content

↓

3004
Associate a badge with a user profile of the content creator in a user interface of the content creation service that is indicative of deployment of content created by the content creator as part of one or more marketing activities

↓

3006
Associate a badge with the content in a user interface of the content creation service that is indicative of deployment of the content as part of one or more marketing activities

3302
Receive data describing tracked deployment of a plurality of marketing activities and content included as part of respective ones of the plurality of marketing activities to a plurality of potential consumers

3304
Segment the data and corresponding content as being associated with a respective one of a plurality of marketing channels

3306
Rate the content based on usage within respective ones of the plurality of marketing channels

3308
Expose the ratings of the content that are usable to select respective said content for inclusion with a marketing activity based on identification of one or more of the plurality of marketing channels that are associated with a respective potential consumer that is to receive the marketing activity

*Fig. 33*

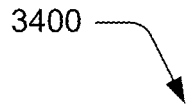

3402
Monitor Interaction of one or more users with content available via a shared network resource

3404
Collect comments and markups made in association with the content as part of the monitored interaction

3406
Expose a user interface for display that includes the content and the markups in which at last one of the markups is disposed over a display of the content and an activity stream that includes the collected comments

*Fig. 34*

CONTENT CREATION, DEPLOYMENT COLLABORATION, AND SUBSEQUENT MARKETING ACTIVITIES

RELATED APPLICATIONS

This application claims priority under 35 U.S.C. Section 119(e) to U.S. Provisional Patent Application No. 62/085,040, filed Nov. 26, 2014, and titled "Content Creation and Deployment Collaboration," the entire disclosure of which is hereby incorporated by reference.

BACKGROUND

Marketing activities may take a variety of forms to increase awareness of products and services to potential consumers. For example, online marketing activities include use of banner ads, links, webpages, online videos, and so on that are accessible via the Internet. Marketing activities are also configurable for use that does not involve the Internet, such a physical fliers, television advertising, printed advertisements, and so forth.

As such, marketing activities encompass a variety of content, such as images, sound, media, and so forth. However, conventional techniques that are employed to select content for inclusion in marketing activities are typically performed "from scratch." For example, a marketing professional that desired to create a marketing activity for a particular product typically chose content for inclusion in the layout by relying on the professional's intuition in creating the activity. Although the marketing professional may be aware of other marketing activities that were successful and thus leverage knowledge of these other marketing activities, the professional may not be aware as to why these activities were actually successful. Thus, this often left the marketing professional to make a best guess regarding this success in the creation of a new marketing activity, which could be complicated, time consuming, and may not be accurate.

SUMMARY

Content creation and deployment collaboration techniques are described. In one or more implementations, a content creator utilizes devices as well as tools of a content creation service to create content, such as an image, sound data, media, and so on. Metadata that describes the creation of the content is associated with the content, such as characteristics of a device used, applications and functionality of the applications used to process the content, environmental factors, description of objects within the content, and so forth. The content is then be provided from the content creation service to a content deployment service for deployment as part of a marketing activity.

Deployment data obtained from this tracking is usable to support a variety of functionality. Content creators, for instance, may receive this data to determine which of their content has been successfully employed as part of marketing activities. Marketers may also use knowledge of the deployment of the content to choose content to be included in a marketing activity as well as select content creators that are best suited to provide this content. Badges may also be configured for association with respective items of content and/or user profiles of content creators.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 29 is a flow diagram depicting a procedure in an example implementation in which content is deployed and tracked using a usage tracking monitor.

FIG. 30 is a flow diagram depicting a procedure in an example implementation in which badges are associated with a user profile and an item of content that are indicative of deployment of content created by the content creator as part of marketing activities.

FIG. 33 is a flow diagram depicting a procedure in an example implementation in which data describing tracked deployment of a plurality of marketing activities is segmented by channel and content within those channels is rated to serve as suggestions for selection of content.

FIG. 34 is a flow diagram depicting a procedure in an example implementation in which an activity stream is employed that is used to display comments and markups to content.

DETAILED DESCRIPTION

Overview

Figure 1:
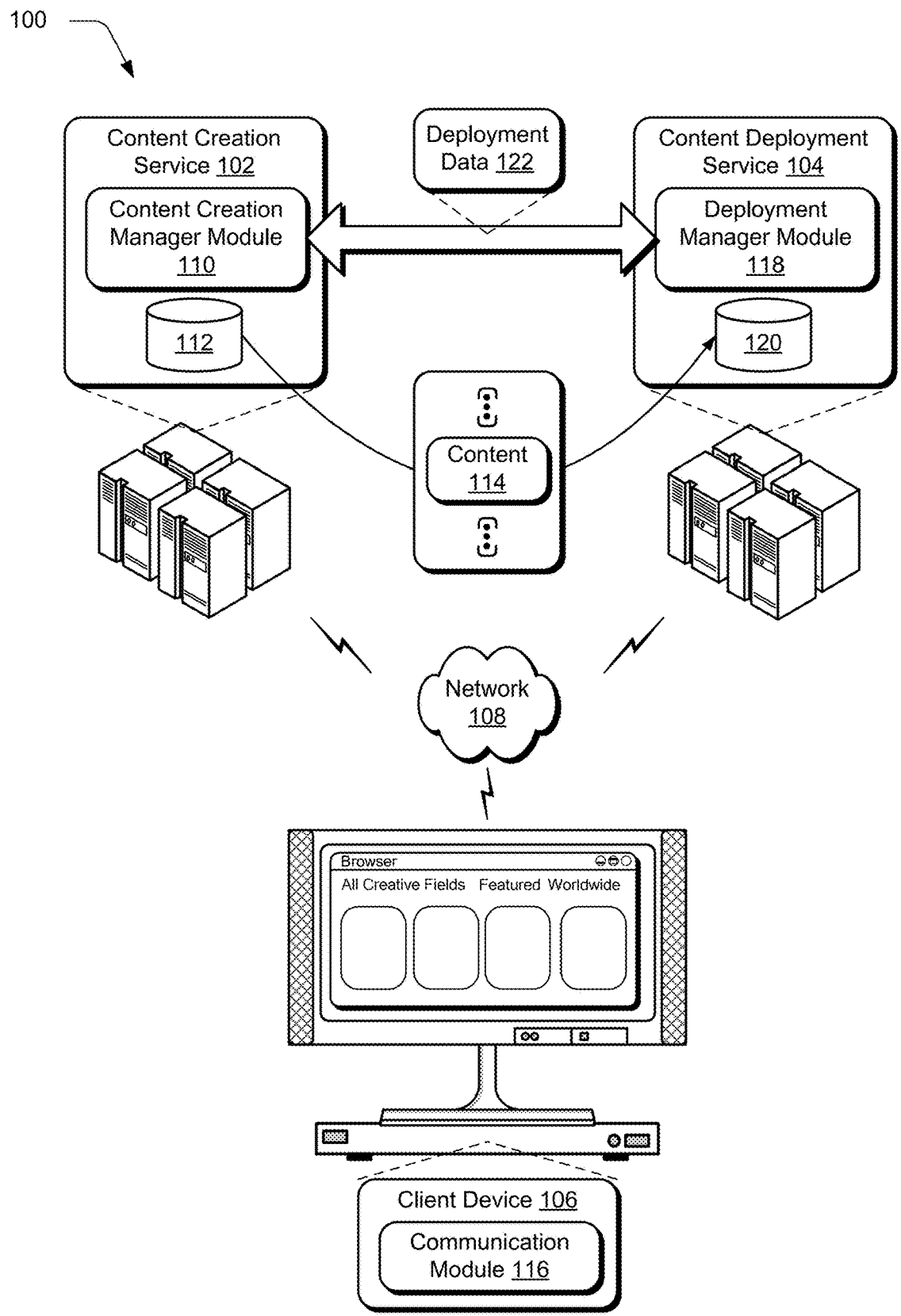
FIG. 1 is an illustration of an environment in an example implementation that is operable to employ content creation and deployment techniques described herein.

Content creation and deployment collaboration techniques are described. In one or more implementations, data is shared between a content creation service and a content deployment service, which supports a variety of functionality. For example, a content creator (e.g., a content author) may utilize devices (e.g., a camera, microphone) as well as tools of a content creation service (e.g., image or sound processing applications) to create content, such as an image, sound data, media, and so on. Metadata that describes the creation of the content is associated with the content, such as characteristics of a device used, applications and functionality of the applications used to process the content, environmental factors, description of objects within the content, and so forth.

The content is then provided from the content creation service to a content deployment service for deployment as part of a marketing activity. The content, in one such instance, is associated with a tracking monitor to enable the content deployment service to track the deployment of the content, e.g., to determine a number of times accessed by potentials customers, how and when accessed, identities of who accessed the content, and so forth. Deployment data obtained from this tracking may be utilized to support a variety of functionality.

Content creators, in one such instance, receive this data to determine which of their content has been successfully employed as part of marketing activities and use this information in the creation of future content. Likewise, marketers may also use knowledge of the deployment of the content to choose content to be included in a marketing activity as well as select content creators that are best suited to provide this content. For example, knowledge of a marketing channel used to provide the content us usable to select and control use of appropriate content as part of a marketing activity. Even manufacturers of the devices used to create the content may find this information useful, such as to determine which devices are typically used to capture content as well as how those devices are utilized in the creation of the content.

A variety of other feedback is also supported by leveraging a connection between a content creation service and a content deployment service, such as to configure badges for association with respective items of content and/or user profiles of content creators. The badges may be indicative of an amount of deployment of the content as part of one or more marketing activities, e.g., associated with particular levels, include a counter indicating a number of uses in a marketing activity and so on. The badges may also be indicative that may be awarded based on thresholds, content type, views, downloads, purchases, output channels, length of service, length of asset in service, content creation service peer or deployment referrals, social network usages and mentions (e.g., Facebook®, LinkedIn®, Behance®, Twitter®), and so on. Further discussion of these and other content creation and deployment collaboration techniques is described in the following and shown in corresponding figures.

In the following discussion, an example environment is first described that is configured to employ the content creation and deployment collaboration techniques described herein. Example procedures are then described which may be performed in the example environment as well as other environments. Consequently, performance of the example procedures is not limited to the example environment and the example environment is not limited to performance of the example procedures.

Example Environment

Figure 8:
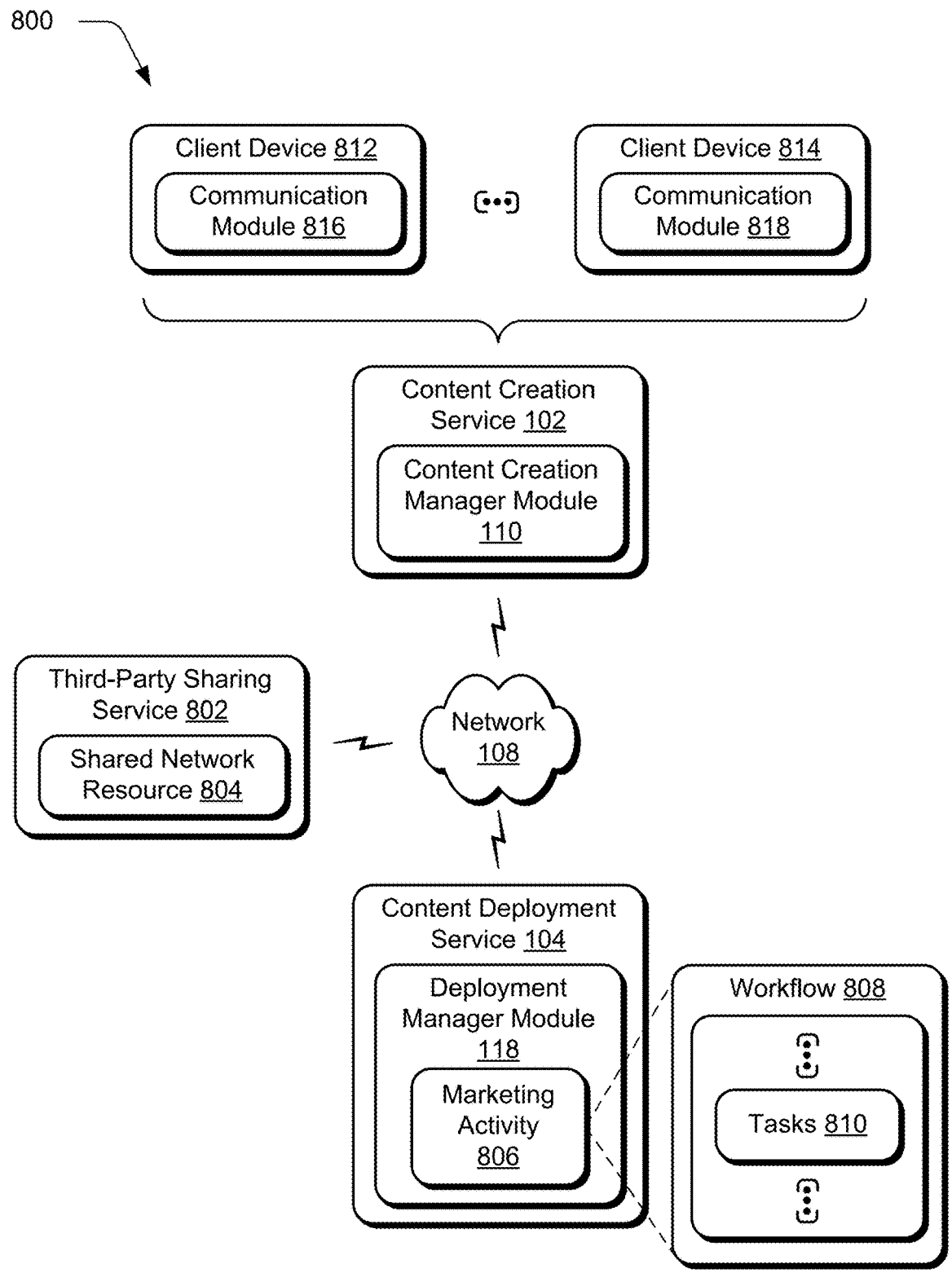
FIG. 8 depicts a system in an example implementation in which a workflow is utilized as part of generation of content as part of a marketing activity.

FIG. 1 is an illustration of an environment 100 in an example implementation that is operable to employ techniques described herein. A digital medium environment is illustrated that is configured to create and deploy marketing activities as well as create content for inclusion as part of the marketing activities. The illustrated environment 100 includes a content creation service 102, a content deployment service 104, and a client device 106 that are communicatively coupled, one to another, via a network 108. Although illustrated separately, functionality represented by the content creation service 102 and the content deployment service 104 are also combinable into a single entity, may be further divided across other entities that are communicatively coupled via the network 108 (e.g., a third party sharing service as shown in FIG. 8), and so on.

Computing devices that are used to implement the content creation service 102, content deployment service 104, and the client device 106 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102 and the content deployment service 104, further discussion of which may be found in relation to FIG. 35.

The content creation service 102 is illustrated as including a content creation manager module 110 and storage 112 that are representative of functionality that is available via the network 108 to create and store content 114. The client device 106, as illustrated, includes a communication module 116 that is representative of functionality to access the content creation service 102 and/or the content deployment service 104 via the network 108. As such, the communication module 116 may be configured in a variety of ways, such as a browser, a network-enabled application, and so forth.

Regardless of how the communication module 116 is implemented, the content creation manager module 110 provides a variety of functionality for access by the client device 106 that is related to the creation of content 114. Examples of this functionality include graphic design, video editing, web development, sound data processing, and photography. For example, functionality supported by the content creation manager module 110 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth. Additionally, the content creation manager module 110 also supports an online social-media based portfolio service for content creators (e.g., Behance®), further discussion of which may be found in the following. Thus, a variety of applications are accessible by the client device 106 to create content 114 having a variety of different forms.

The content 114, once created, may then be communicated to a content deployment service 104. The content deployment service 104 is illustrated as including a deployment manager module 118 and storage 120 that are representative of functionality to deploy the content 114 as part of a marketing activity. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

As previously described, marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The deployment manager module 118 includes functionality to configure content 114 for inclusion as part of a marketing activity as well as track deployment of the content 114 as part of the marketing activity. The deployment manager module 118, for instance, associates a tracking monitor to track the deployment of the content 114, e.g., to determine a number of times accessed by potentials customers, how and when accessed, identities of who accessed the content, and so forth. Deployment data 122 obtained from this tracking is then usable to support a variety of functionality.

The deployment data 122, for instance, is communicated back to the content creation service 102, which supports a variety of functionality. For instance, the deployment data 122 is utilized to provide feedback to content creators regarding the deployment of their content 114. This is utilized, for instance, along with the characteristics of the content 114 from the associated metadata that describes the creation of the content 114 that is successful or not successful as part of a marketing activity. In this way, the deployment data 122 acts as a guide to future creation of content by the content creator.

Likewise, the deployment data 122 may also be utilized by marketers in crafting future marketing activities as well as to make modifications to a current marketing activity. The metadata describing the creation of the content 114 along with the deployment data 122 describing use of the content 114 as part of the marketing activity may be examined to determine characteristics of content 114 that are successful and/or not successful in respective types of marketing activities. Thus, the marketer may gain insight regarding characteristics of content to be included in future marketing activities as well as changes that may be made to the current marketing activity.

The deployment data 122, along with the metadata describing the content creation, is also usable by the content creation service 102 as part of an online social-media based portfolio service. The content creation manager module 110, in one such instance, generates badges for association with a user profile of a content creator and/or an item of content itself that describes the deployment of content as part of one or more marketing activities. This serves as a mechanism for marketers to locate content creators of interest as part of the social service as well as incentivize content creators to utilize and develop content for inclusion as part of the content creation service 102. Other examples are also contemplated, such as to output the deployment data 122 for viewing by manufacturers and sellers of devices used to create the content. Further description of these and other examples may be found in relation to the following discussion and are shown in corresponding figures.

Figure 2:
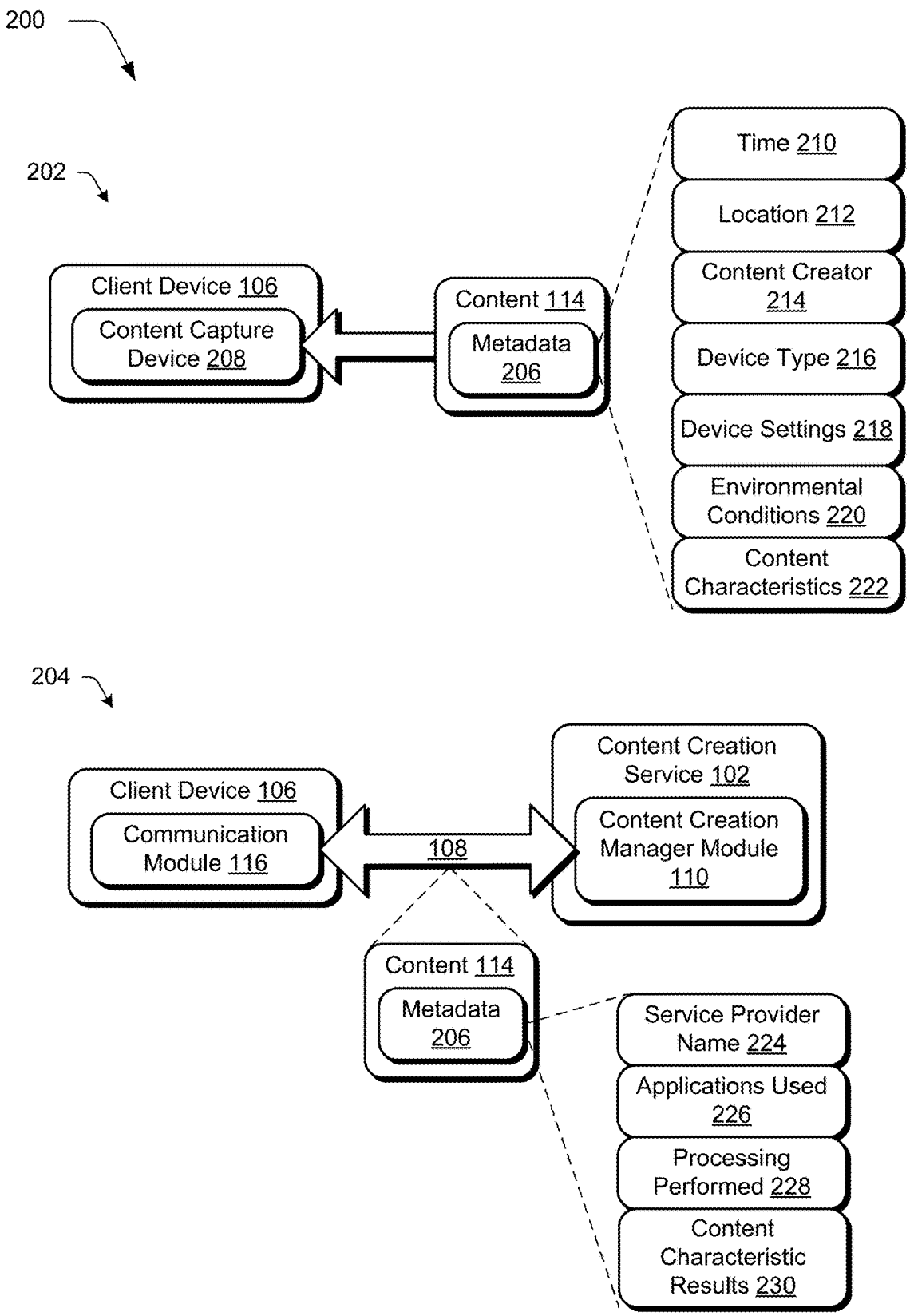
FIG. 2 depicts an example implementation in which examples of content creation by a content creator are shown.

FIG. 2 depicts an example implementation 200 in which examples of content creation by a content creator are shown. The implementation 200 includes first and second examples 202, 204 of content creation, which may be performed separately or together. At the first example 202, for instance, content 114 is associated with metadata 206 that describes creation of the content 114. The content 114, for instance, may be captured by a content capture device 208, e.g., an image capture device, video camera, microphone, and so on. Although illustrated as part of the client device 106, the content capture device 208 is also configurable as a stand-alone device, is usable by someone other than a user of the client device 106, and so forth.

The metadata 206 is usable to describe a variety of characteristics involved in the capturing of the content 114. In an example, the metadata 206 describes a time 210 and location 212 at which the content 114 is created. The metadata 206 also references a content creator 214 (e.g., author) that utilized the content capture device 208, a web site address of the content creator, and so forth. In another example, the metadata describes characteristics of a device (e.g., the content capture device 208) utilized to create the content 114. This includes device type 216 and device settings 218, such as flash usage, focal length, aperture value, exposure time, zoom level, digital versus analog zoom, lens type, resolution, or device identifier.

The metadata 206 may also describe environmental conditions 220 of a scene in which the content is captured, such as a scene classification, lighting conditions, whether the environment is likely indoors or outdoors, e.g., based on exposure time for an image or background noise for sound data, and so forth. Content characteristics 222 are also describable by the metadata 206, such as identification of one or more objects included in the captured content 114 (e.g., a car, dog, etc.), audio metadata that identifies sources of sounds and/or the sounds themselves (e.g., a choir, barking of a dog), and forth. Creation of content may also include editing of the content and even generation of the content without capturing the content, e.g., composed by a content creator through interaction with one or more applications.

As shown in the second example 204, for instance, the client device 106 communicates with the content creation manager module 110 of the content creation service 102 to create content 114, e.g., to compose original content, edit the content 114 captured in the first example 202, and so forth. As such, metadata 206 also describes content creation performed through interaction with the content creation service 102.

The metadata 206, for instance, references a service provider 224 that hosts applications, applications used 226 that are made available at the service provider, processing (e.g., filters) performed 228 by those applications, and content characteristic results 230 of the creation of the content 114, e.g., motion path blurs of a blur filter. For example, the metadata 206 describes one or more image processing operations applied to the content 114 and identifies one or more applications used to perform the processing of an image, sound data, video, and so forth.

Thus, the metadata 206 is usable to describe a variety of characteristics involved in the creation of the content 114, which support a variety of functionality, examples of which are described in the following and shown in corresponding figures.

Figure 3:
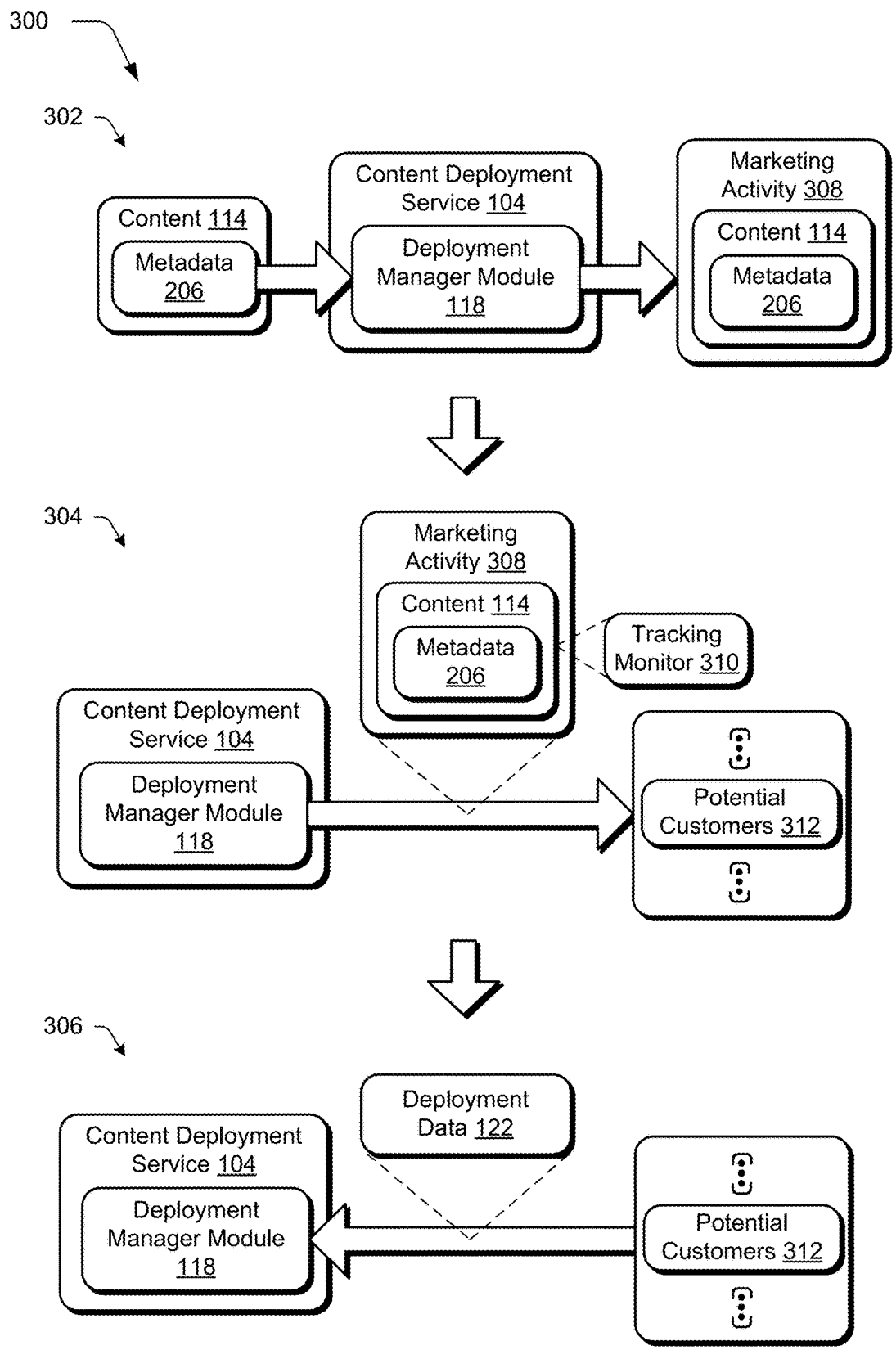
FIG. 3 depicts an example implementation in which content is associated with a marketing activity, deployed as part of the marketing activity, and deployment data is collected describing the deployment.

FIG. 3 depicts an example implementation 300 in which content is associated with a marketing activity, deployed as part of the marketing activity, and deployment data is collected describing the deployment. This example implementation 300 is illustrated using first, second, and third stages 302, 304, 306. At the first stage 302, a content deployment service 104 obtains content 114 having associated metadata 206 that describes creation of the content. The metadata 206 may be associated with the content 114 in a variety of ways, such as stored and communicated along with the content 114, include an indicator specifying the association such that the metadata 206 may be maintained separately from the content 114, and so forth.

The content deployment service 104, through use of the deployment manager module 118 deploys a marketing activity 308 that includes the content 114. A marketer, in one or more such instances, interacts with the content deployment service 104 to create the marketing activity 308, e.g., a layout of content as well as what content that is included in the activity, communicates a marketing activity 308 that is created locally by the marketing professional, and so on. In one or more implementations, the metadata 206 associated with the content 114 also describes how the content 114 is employed by the marketing activity 308, such as placement within a layout of the marketing activity 308, describes the marketing activity 308 itself (e.g., to sell shoes), and so forth.

At the second stage 304, the content deployment service 104 deploys the marketing activity 308 having the content 114. The marketing activity 308 and/or the content 114 of the marketing activity includes a tracking monitor 310 in this example. The tracking module 310 is usable in conjunction with the content deployment service 104 to track deployment of the marketing activity 308 and the content 114 included as part of the marketing activity 308 to one or more potential consumers 312. For example, a push model may be employed in which data is communicated by the tracking module 310 to the content deployment service 104. A pull model may also be employed in which data is provided responsive to a request received form the content deployment service 104, example of which are further described below.

At the third stage 306, deployment data 122 is received by the content deployment service 104 that describes deployment of the marketing activity 308 and included content 114 to the potential consumers 312. Continuing with the previous example, the tracking monitor 310 is configurable in a variety of ways to cause deployment data 122 to be communicated back to the content deployment service 104.

The tracking monitor 310, in one or more such instances, actively monitors the potential consumers' 312 interaction with the marketing activity 308 and corresponding content 114 and communicate deployment data 122 that describes this interaction. This includes a number of interactions (e.g., views), who interacted with the content 114, when the interaction occurred, how the interaction occurred (e.g., via a browser, client device specifics), a location of the potential consumers 312 and/or provider that interacted with the content 114, and so forth. Inactive examples are also contemplated in which the tracking monitor 310 is locatable by the content deployment service 104, the provision of content 114 it utilized to track the marketing activity (e.g., downloads of the content when viewed by potential consumers 312), and so forth. Thus, the deployment data 122 describes a variety of different interactions with the content 114 and corresponding marketing activity 308 that are usable in a variety of ways, examples of which are describes as follows and shown in corresponding figures.

Figure 4:
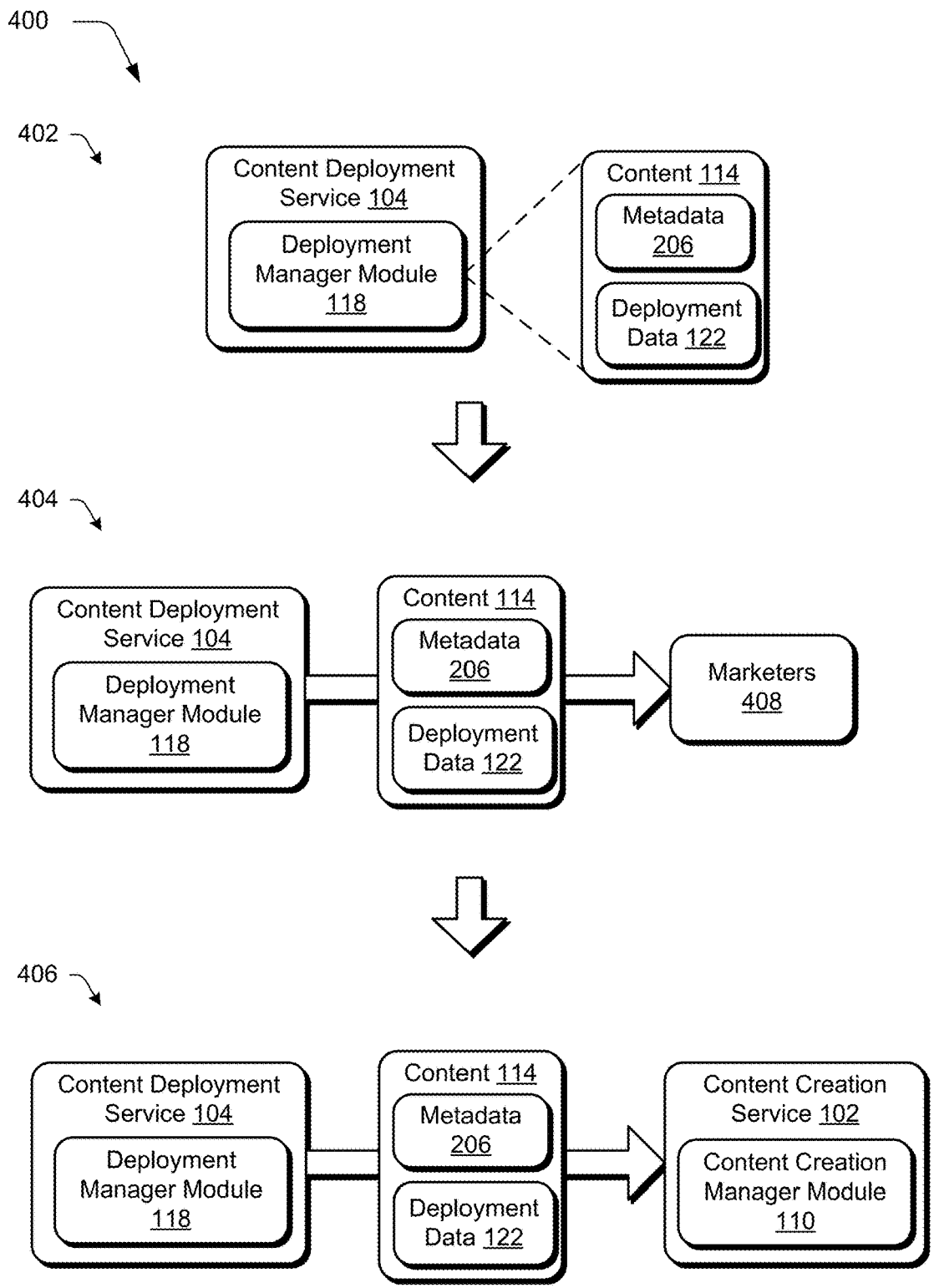
FIG. 4 depicts an example implementation in which deployment data of FIG. 3 is leveraged along with metadata associated with content of FIG. 2 that describes the creation of the content.

FIG. 4 depicts an example implementation 400 in which the deployment data 122 of FIG. 3 is leveraged along with metadata 206 associated with content 114 of FIG. 2 that describes the creation of the content 114. This example implementation 400 is illustrated using first, second, and third stages 402, 404, 406. At the first stage 402, a content deployment service 104 associates content 114, metadata 206, and deployment data 122 to each other. As previously described, the metadata 206 may be associated with the content 114 in a variety of ways, such as communicated with the content 114, stored separately (i.e., apart from) the content 114 with an indication (e.g., name) of the content 114 to which it corresponds, and so forth. The deployment data 122 and the metadata 206, alone or in combination, support a variety of functionality.

At the second stage 404, for instance, the content deployment service 104 communicates the content 114 with the metadata 206 and corresponding deployment data 122 to marketers 408. The marketers 408, for instance, may be the same marketers that generated the marketing activity 308. Therefore, the associated deployment data 122 provides metrics that are usable by the marketers 408 to track effectiveness of the content 114 as part of the marketing activity 308 as well as the marketing activity as a whole. In this way, the marketers 408 may make decisions regarding the marketing activity (e.g., whether to make changes to content included in the marketing activity) as well as may be used for other subsequent marketing activities as further described below.

Additionally, association of the metadata 206 that describes creation of the content 114 along with the deployment data 122 supports a variety of different pivots that are indicative of relationships of characteristics of the content 114 with the marketing activity 308. As previously described, the metadata 206 describes characteristics of a device used to capture the content, functionality utilized to edit and create the content, environmental factors associated with the content, authors (i.e., content creators) of the content 114, and so forth. In this way, the marketers 408 may determine from this content 114 (and even when aggregated with other content) characteristics of the content 114 indicated by the metadata 206 that are or are not successful as part of marketing activities, further discussion of which may be found in relation to FIG. 5.

In another example as shown in the third stage 406, the content deployment service 104 communicates the content, associated metadata 206, and deployment data 122 for use by a content creation service 102. This is usable in a variety of ways. In one or more examples of this, the deployment data 122 provides real time feedback to a content creator regarding use of the content 114. The deployment data 122 is also usable to generate badges for association with the content 114 and/or a user profile of the content creator indicating usage of the content as part of marketing activities, e.g., different levels indicating respective numbers of instances of interaction by potential consumers 312. Additionally, a combination of the metadata 206 with the deployment data 122 may be helpful in informing the content creator as to characteristics of content 114 that are or are not successful as part of a marketing activity. Further discussion of these and other features may be found in relation to FIGS. 5 and 6.

Figure 5:
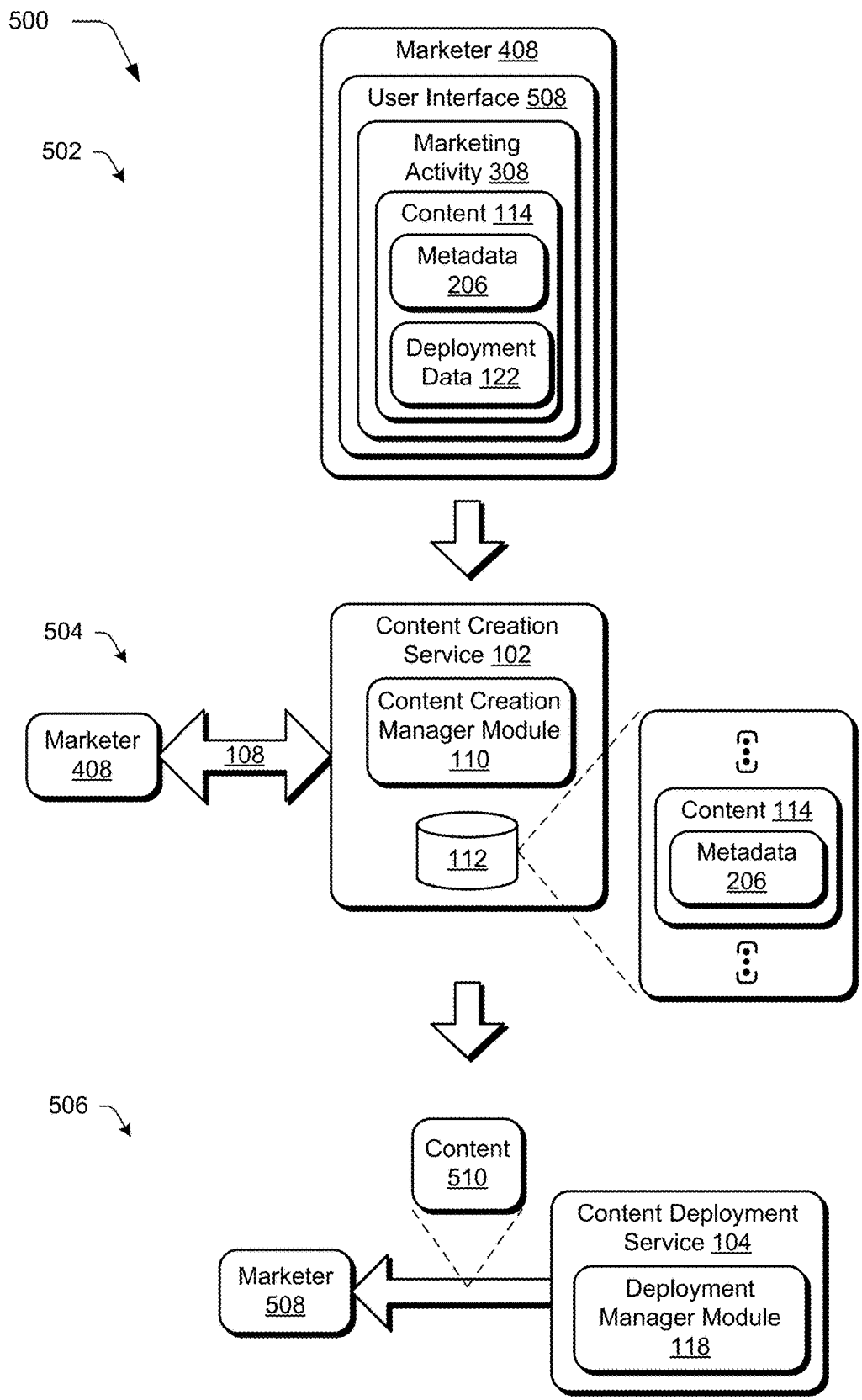
FIG. 5 depicts an example implementation in which content, associated metadata, and deployment data are leveraged by a marketer to obtain content for a marketing activity.

FIG. 5 depicts an example implementation 500 in which content 114, associated metadata 206, and deployment data 122 are leveraged by a marketer 408 to obtain content for a marketing activity. This example implementation 500 is also shown using first, second, and third stages 502, 504, 506. At the first stage 502, a marketer 408 interacts with a user interface 508 that outputs data describing a marketing activity 308 as well as content 114 that is included as part of the marketing activity 308.

The user interface 508 also includes metadata 206 that describes creation of the content 114 and deployment data 122 that describes deployment of the content 114 as part of the marketing activity 308. Thus, a marketer 408 interacts with the user interface 508 to view a relationship of content 114 to the marketing activity 308, which is performable in real time such that the marketer 408 may make changes to the marketing activity 308 based on this feedback.

The user interface 508 may also be configured to aggregate the content 114, metadata 206, and deployment data 122 from a plurality of marketing activities 308. In this way, the marketer 408 may observe trends and commonalities between the metadata 206 that describes creation of the content 114 and success or lack thereof of marketing activities 308 having this content 114. The marketer 408 may then use this information as a guide to creation of subsequent marketing activities, e.g., to replace content having a landscape of a particular location with a landscape of another location for marketing activities deployed at specific geographic locations.

Figure 6:
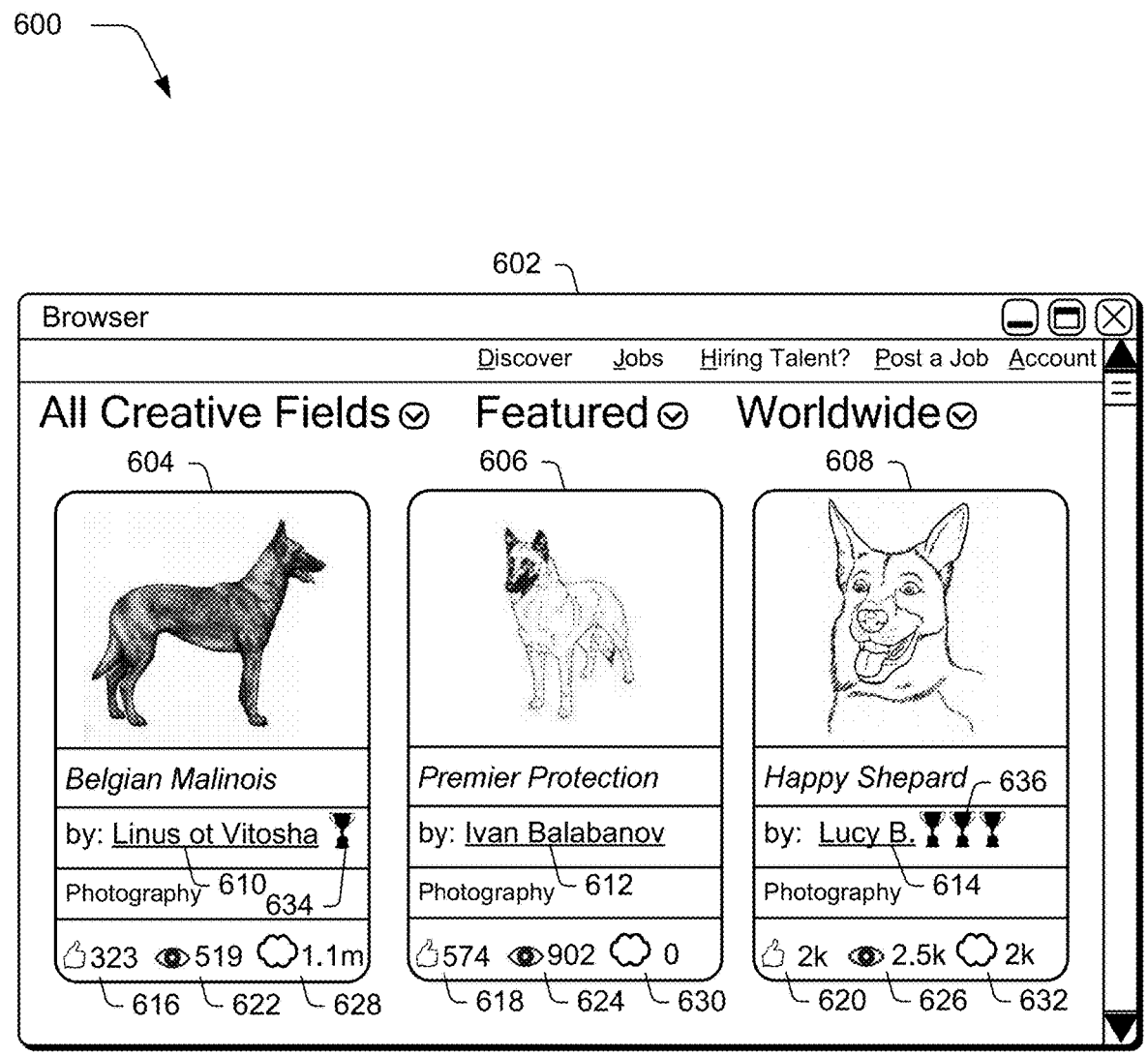
FIG. 6 depicts an example implementation showing a user interface of an online social-media based portfolio service.

As shown in the second stage 504, for instance, a marketer 408 may use this information to interact with a content creation service 102 to locate content 114 having metadata 206 that corresponds to metadata 206 that has been found to be successful as part of marketing activities 308. At the third stage 506, the marketer obtains content 510 from the content deployment service 104 (or directly from a content creator) having these characteristics. For instance, the marketer 408, through use of the digital marketing environment of FIG. 1, locates similar content 510 from the content deployment service 104 exposed as part of the online social-media based portfolio service as shown in FIG. 6. In another instance, the marketer 408 locates content creators that have created content having similar characteristics and then makes an offer to the content creators to create content 510 having the desired characteristics as also shown and described in relation to FIG. 6.

The marketer 408, for instance, may choose content creators that are more naturally suited to creating content that is optimized for a particular marketing activity, e.g., if landscapes will be effective, the marketer 408 chooses a content creator that has landscapes in their portfolio on the online social-media based portfolio service. Location of the content creators may also be aided through the use of badges, an example of which is described in relation to FIG. 6.

The user interface 508 is configurable to output suggestions for content to be included based on the metadata 206 and deployment data 122. The marketer 408, in one or more such instances, provides inputs describing characteristics of a marketing activity to be created and/or content for inclusion as part of the marketing activity. For example, the marketer 408 may provide a textual description of the marketing activity 308 and/or content 114, select examples of content 114 for inclusion that are not to be included themselves but represent characteristics that are desirable by the marketer, and so forth. The content creation service 102 then outputs suggestions of characteristics of the content (e.g., the metadata 206) based on the metadata 206 that have been successful or not successful as indicated by the deployment data 122. Further, this is performable as part of a workflow in which tasks are assigned along with comments and markups shared to create desired content, further discussion of which may be found in relation to FIGS. 8-24.

In another instance, the metadata 206 and deployment data 122 are utilized to verify potential success of a marketing campaign created by the marketer 408. This is performed through comparison of metadata associated with content of the created marketing campaign with metadata associated with content of other marketing campaigns and the corresponding deployment data of those other campaigns. For example, a user may upload a marketing activity having content and associated metadata describing creation of the content and receive an indication of a likelihood of success of the marketing activity. An indication is also received having suggestions of changes that may be made based on the metadata 206 and associated deployment data 122, e.g., to include different content, include different characteristics of the content, indicate that the content is likely to be successful as part of the marketing activity, and so forth.

FIG. 6 depicts an example implementation 600 showing a user interface 602 of an online social-media based portfolio service. Content 604, 606, 608 of content creators associated with respective user profiles 610, 612, 614 is displayed in the user interface as part of their associated portfolio, which are photographs of dogs in this example but other images and types of content are also contemplated, such as sound data, media, and so forth. Each item of content 604, 606, 608 also includes an indication 616, 618, 620 of a number of likes/approvals of the respective item of content 604, 606, 608 as well as an indication 622, 624, 626 of a number of times the respective item of content 604, 606, 608 was viewed using the online social-media based portfolio service.

The user interface 602 of the content creation service 102 also leverages the deployment data 122 obtained from the content deployment service 104. For example, badges 628, 630, 632 are associated with respective content items indicating deployment of the content as part of a marketing activity. Badge 628, for instance, includes a counter indicating that content 604 was involved with 1.1 million interactions as part of a marketing activity, whereas badge 630 indicates that content 606 is not involved in a marketing activity and content 608 is involved with two thousand interactions as part of a marketing activity.

The badges 628-632 and counters included as part of the badges 628-632 are updatable in real time as part of the deployment of the marketing activity and thus provide a content creator with an up-to-date indication of the use of the content. Other examples are also contemplated, such as to delay display and/or support anonymous display to protect this information from outside parties. For example, if such count information is considered proprietary to the marketer 408, the system also "anonymize" the data by not relating the views to any specific asset but provide a general badge associated with the creator (e.g., as shown for badges 634, 636) or even delay reporting until such time as deemed appropriate.

Badges 634, 636, for instance, may also be associated with user accounts 610, 614 of online social-media based portfolio service of a content. The badges 624, 626, for instance, is indicative of deployment of content created by the content creator as part of one or more marketing activities, whether for the content item 604, 608 itself or for a plurality of items of content created by the content creator.

For example, the badges 634, 636 are indicative of a particular one of a plurality of different levels of deployment of the content as part of one or more marketing activities. Badge 636 indicates that the content creator of user profile 608 has had a greater amount of deployment (as indicated by a level associated with three trophies) than a badge 634 that is associated with user profile 610 and the lack of a badge for user profile 606. Thus, these badges 634, 636 are indicative of a reputation of a corresponding user profile 634, 636 and therefore encourage content creators to employ the content creation and deployment services 102, 104 to include their content. This also supports the ability to view success of a content creator by marketers 408, which may then seek out content creators for future campaigns who have had previous success as evidenced by these objective metrics associated with the marketing activities. A variety of other badge configurations are also contemplated, which are awarded based on thresholds, content type, views, downloads, purchases, output channels, length of service, length of asset in service, content creation service peer or deployment referrals, social network usages and mentions (e.g., Facebook®, LinkedIn®, Behance®, Twitter®), and so on.

The combination of the two scenarios is equally powerful. For example, a marketer 408 may seek out both a content creator who has an objective success rate as indicated by the badges and also one who specializes in the type of asset for which the marketing activity is focused. If a landscape shot with a particular camera at a particular location has been shown to be effective as a background for an ad, for instance, the marketer 408 selects a content creator meeting those criteria who is shown to be successful in campaigns for that pivot and not merely a creator who is just successful overall. Thus, the combination of the deployment data 122 describing deployment of the marketing activity 308 along with metadata 206 describing creation of the content 114 is usable to support a variety of different functionality.

Figure 7:
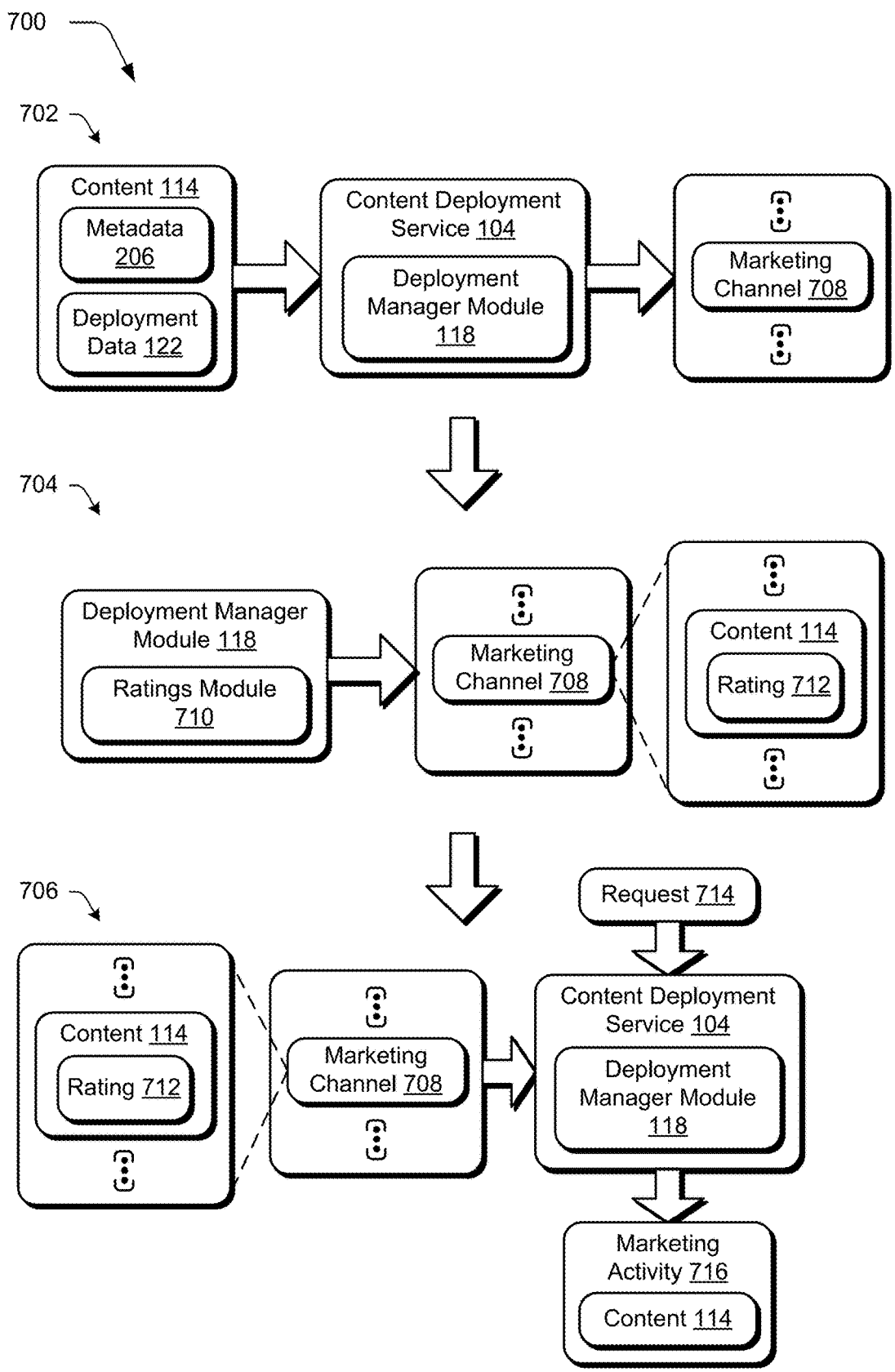
FIG. 7 depicts a system in an example implementation in which marketing channel usage is identified and leveraged via ratings to select content for inclusion as part of a marketing activity.

FIG. 7 depicts a system 700 in an example implementation in which marketing channel usage is identified and leveraged via ratings to select content for inclusion as part of a marketing activity. The system 700 is illustrated using first, second, and third stages 702, 704, 706. Marketing activities are typically associated with marketing channels, which relate to how the marketing activity is to be consumed. Consequently, in this example content usage is rated within marketing channels, which is utilized to select content for inclusion in a particular marketing activity. Further, these techniques also leverage the metadata techniques described above as part of the rating to give greater weights and thus higher rankings to content having metadata with greater commonalities within the marketing channels, e.g., metadata that has exhibited increased usage within the marketing channel.

At the first stage 702, for instance, the deployment manager module 118 of the content deployment service 104 receives content 114 that includes metadata 206 and deployment data 122 as previously described. The deployment data 122, for instance, describes deployment of the content 114, e.g., as part of a marketing activity. The metadata 206 describes characteristics of the content and/or creation of the content, including environmental conditions, filter used, application utilized, image editing operations performed, devices used, and so forth as previously described.

The deployment manager module 118 in this instance is configured to segment the deployment data 112 and corresponding content 114 into respective ones of a plurality of marketing channels 708. The marketing channels 708, for instance, define how the marketing activity that includes the content 114 is to be consumed. Accordingly, the marketing channels 708 are definable based on this consumption, such as a device used to perform the consumption (e.g., mobile versus desktop versus living room), a type of communication to be used to communicate the marketing activity (e.g., message, banner ad, email, printed publication, billboard), where the marketing activity is going to be consumed (e.g., geographic location such that different images or rendition are usable to culturally adjust selection of the "best" content), and so forth. Thus, at this point each marketing channel 708 "bucket" includes deployment data 122 that describes deployment of respective content 114 in that channel.

At the second stage 704, the deployment manager module 118 employs a ratings module 710 that is representative of functionality to generate ratings 712 for respective content 114 based on usage within the marketing channels 708. As previously described, the deployment data 122 is segmented into marketing channels 708 which describes usage of the content 114 within those marketing channels 708. The ratings module 710 may then rate the usage of the content 114 within those channels based on this data (e.g., generate a score) and thus may determine which items of content 114 performed "best" within the marketing channel 708, e.g., by using the ratings 712 to rank the content 114, one to another. In this way, the ratings 712 may also be used to indicate which of the content 114 has the best performance within the marketing channel 708.

The ratings may also be based on the metadata 206 and thus take into account characteristics of the content 114 as described above. In one or more such examples, the ratings are also based on commonalities of the metadata 206 within the marketing channel 708, such as common characteristics of the content, environmental conditions, a device used to create the content, and so on. Thus, content 114 having more of these types of metadata that is common to successful content 114 as indicated by the ratings 712 is adjustable to be given greater weight, e.g., an increased rating 712. These ratings 712 are then be exposed for selecting content 114 to be included as part of a marketing activity based on the marketing channel 708.

At the third stage 706, for instance, the deployment manager module 118 receives a request 714 to generate a marketing activity 716. As part of this generation, the deployment manager module 118 examines the ratings 712 for content 114 for a marketing channel 708 that corresponds with the request 714. The deployment manger module 117 then selects content 114 based on the ratings 712, e.g., has a highest ranking in relation to other content 114 included within the marketing channel 708.

In another example, this selection is based on the ranking of the metadata 206 and thus usable to select content 114 that corresponds to that metadata, e.g., device type, environmental conditions, content characteristics, and so forth. The content 114 is then included as part of the marketing activity 716 for deployment as previously described. A variety of other examples are also contemplated as further discussion in relation to the procedures section.

FIG. 8 depicts a system 800 in an example implementation in which a workflow is utilized in generation of content as part of a marketing activity. The system 800 as illustrated includes the content creation service 102 and the content deployment service 104 as described above. The system 800 also includes a third-party sharing service 802 that is usable to maintain a shared network resource 804, such as a folder that may be made accessible to other users as further described below.

The deployment manager module 118 is illustrated as managing creation of a marketing activity 806 through use of a workflow 808 having associated tasks 810. The content deployment service 104 in the example supports a "spoke and wheel" organization of management and content creation in which collaboration with the content deployment service 104 is at the center and user accounts of the content creation service 102 are the spokes that share and interact with content through permissions managed by the content deployment service 104. Although illustrated as part of the content deployment service 104, this functionality may also be incorporated as part of the content creation service 102 or elsewhere such as through part of a third-party service.

A managing user (e.g., marketer) at the content deployment service 104, for instance, may initiate workflow 808 related to a marketing activity 806 and/or content to be created for the marketing activity 806. As part of this creation, the workflow 808 includes tasks 810, which are assigned to groups and/or individuals that access the content creation service 102, e.g., by client device 812, 814 having respective communication modules 816, 818 as previously described to access user accounts. Once a task 810 is completed (e.g., creation of content by client device 812), the workflow 808 navigates to the next task 810 automatically and without user intervention. Continuing with the previous example, once a draft of the content is created a next task 810 may involve approval of the draft by a managing user (e.g., the marketer) or for a comment and markup to indicate changes to be made to the content. Tasks 810 may be ad hoc or based on a reusable preconfigured workflow that is selectable by the managing user.

Thus, the content deployment service 104 monitors modification of content, comments and markups made to the content in this example and shares that information with the managing users as well as other users given access to the workflow 808. Thus, the workflow 808 supports creation, comment, and markup through the use of tasks 810. This may be performed such that a contributor and editor both see the markup and content simultaneously, e.g., in real time. In this way, user accounts of the content creation service 102 and the content deployment service 104 are kept up-to-date in real time as changes, comments, and markups are made, such as through use of an activity stream as further described in relation to FIGS. 9-23.

An initiator of the workflow 808, e.g., the managing user described above, may also manage access rights to a shared network resource via which the workflow 808 is available. The shared network resource 804, for instance, is maintained by the content deployment service 104 and/or a third-party sharing service 802. The managing user may then invite other users to access the shared network resource, such as users of client devices 812, 814 and may maintain control of content disposed in the shared network resource such that even when access to other users if revoked, the managing user maintains the content.

In one or more implementations, permissions may be set for read and write access with a specified time limitation for that access. A lower resolution image and/or watermarking may also be employed such that screenshots are not successful in capturing marketing useable versions of the content, thereby protecting the content from malicious parties. Thus, the deployment manager module 118 may be utilized to automatically convert content by adding watermarking, supporting digital rights management (DRM), may be used to create thumbnails to be used to represent the content, and so on and thus preserve the content from malicious parties.

As the content, comments, and markups are created a versioning system may also be maintained by the deployment manager module 118. For example, the deployment manager module 118 is configurable to save and maintain versions responsive to modifications to the content, addition of comments and markups, and so on. In this way, an ability to create and restore versions of the content is supported by the deployment manager module 118. This is also performable at the content deployment service 104 and/or as part of the third-party sharing service 802. For example, a synchronization technique is employed by the content deployment service 104 such that files maintained by the content deployment service 104 are also automatically synchronized with the third-party sharing service 802 as part of a shared network resource 804 maintained there. In this way, availability of the shared network resource 804 may be expanded. In one or more implementations, access rights to both resources are controlled by the managing user as previously described.

The shared network resource, for instance, may be implemented as a network folder that may accept files and other data as part of the workflow 808. Processing of files within the shared network resource is prioritized and throttled in this instance based on a variety of variables and thereby conserves computing device resources, such as based on user account ranking (e.g., using the badges above) and so forth. Metrics are also displayable as part of the shared network resources, such as to indicate files added, processed, which files are used by which users, license types, license timeframes, and so on. Additional resources may be made available to the managing user, e.g., at the content deployment service 104, such as enterprise aligned data connected with the workflows 808 such as channels, versions, total cost, customer rankings, list or contributors to a shared network resource, current tasks 810 that are outstanding, progress, and so forth.

Analytics may also be maintained, such as to track content access and usage from both the content creation service 102 as well as the content deployment service. As previously described, for instance, a user of the content creation service 102 is made aware of pages views and usage of content created by prospective customers. To do this, the content includes a tracking monitor 310 as described in relation to FIG. 3, which is implemented as a script that causes the content to "call home" to capture metrics on usage including geolocation, channel, company, license, segments, and so forth. This is also utilized to support and verify effectiveness through "A/B" testing to determine which items of content have been most successful, and thus rank the content accordingly. Additional ranking may be based on company (e.g., tenant) rankings that are also based on a variety of criteria and thus weight may be given to content based on company ranking and usage.

Further rankings may be specified by the managing user, which is usable as part of a permissioning technique to grant access to the shared network resource. For example, review and approval workflows may be avoided for a well-known contributor, and thus these contributors are given the freedom to create content and the managing user may choose to review, but approval is avoided. However, untrusted contributors trigger a mandatory review and approval workflow by a manger user, i.e., edit. An example of workflow, shared network resource, and permissioning techniques is described in relation to the following figures.

FIGS. 9-24 depict example user interfaces 900-2400 as implementing a workflow that supports an activity stream, comments, markups, and tasks as part of a content creation workflow. Reference to FIGS. 9-24 may also include reference to FIGS. 1-8 in parallel.

Figure 9:
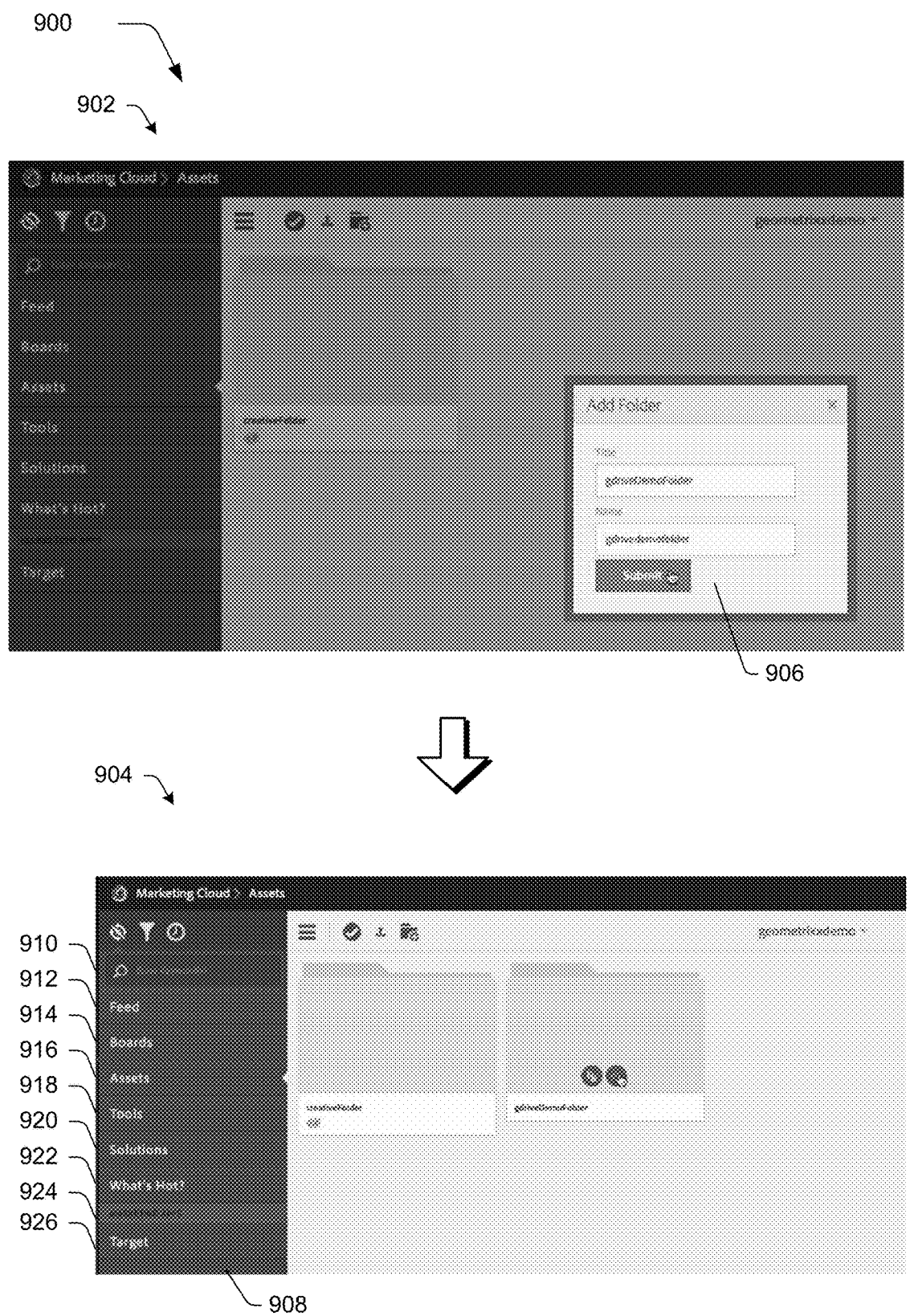
FIG. 9 depicts an example user interface showing creation of a shared network resource to be used as part of a workflow.

FIG. 9 depicts an example user interface 900 showing creation of a shared network resource to be used as part of a workflow. This example implementation is illustrated using first and second stages 902, 904. At the first stage 902, the user interface 900 is output for viewing by a managing user via a content deployment service 104, which may be accessed locally and/or remotely via the network 108, e.g., by client device 106. The user interface 900 includes an option 906 to add a shared network resource (e.g., a folder) for use as part of a workflow 808, such as to specify a title and name for the shared network resource.

At the second stage 904, the added shared network resource is included in an "assets" view of the user interface 900. In this view, different shared network resources are accessible by the managing user, such as for different content associated with different marketing activities and so on.

The user interface 900 also includes a variety of other views that are selectable via a menu bar 908, illustrated examples of which include a search portion 910, feed 912, boards 914, assets 916, tools 918, solutions 920, "What's Hot" 922, marketing apps 924, and target 926 views.

Figure 10:
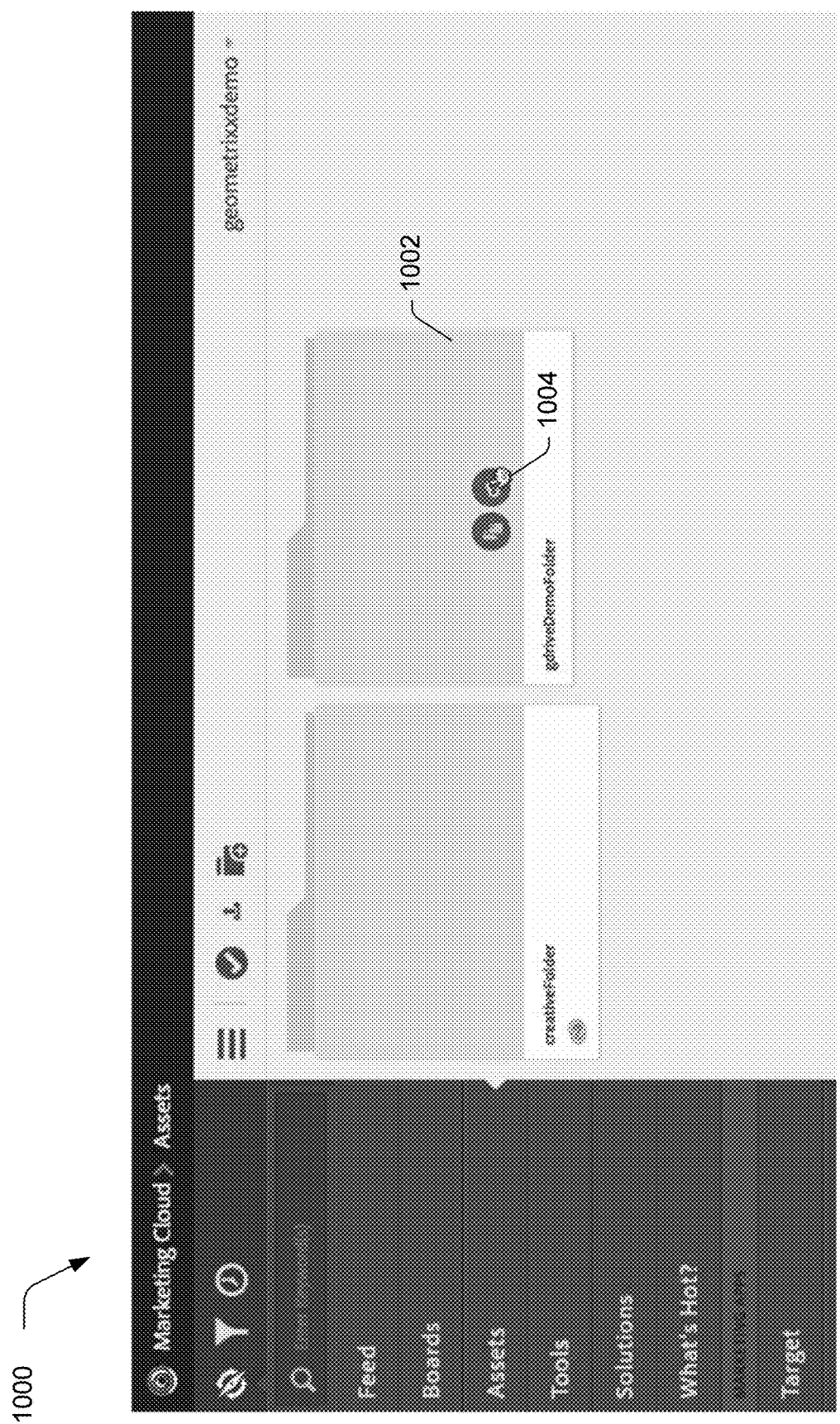
FIG. 10 depicts an example user interface showing initiation of granting access to the shared network resource by a managing user.

FIG. 10 depicts an example user interface 1000 showing initiation of granting access to the shared network resource by the managing user. A representation of the shared network resource 1002 includes an option 1004 that is selectable to grant access to the shared network resource 1002 to other users, e.g., users associated with client devices 812, 814 having access to user accounts of the content creation service 102. Selection of the option 1004 causes output of an option to specify which users are to be granted access, further discussion of which is included in the following and shown in a corresponding figure.

Figure 11:
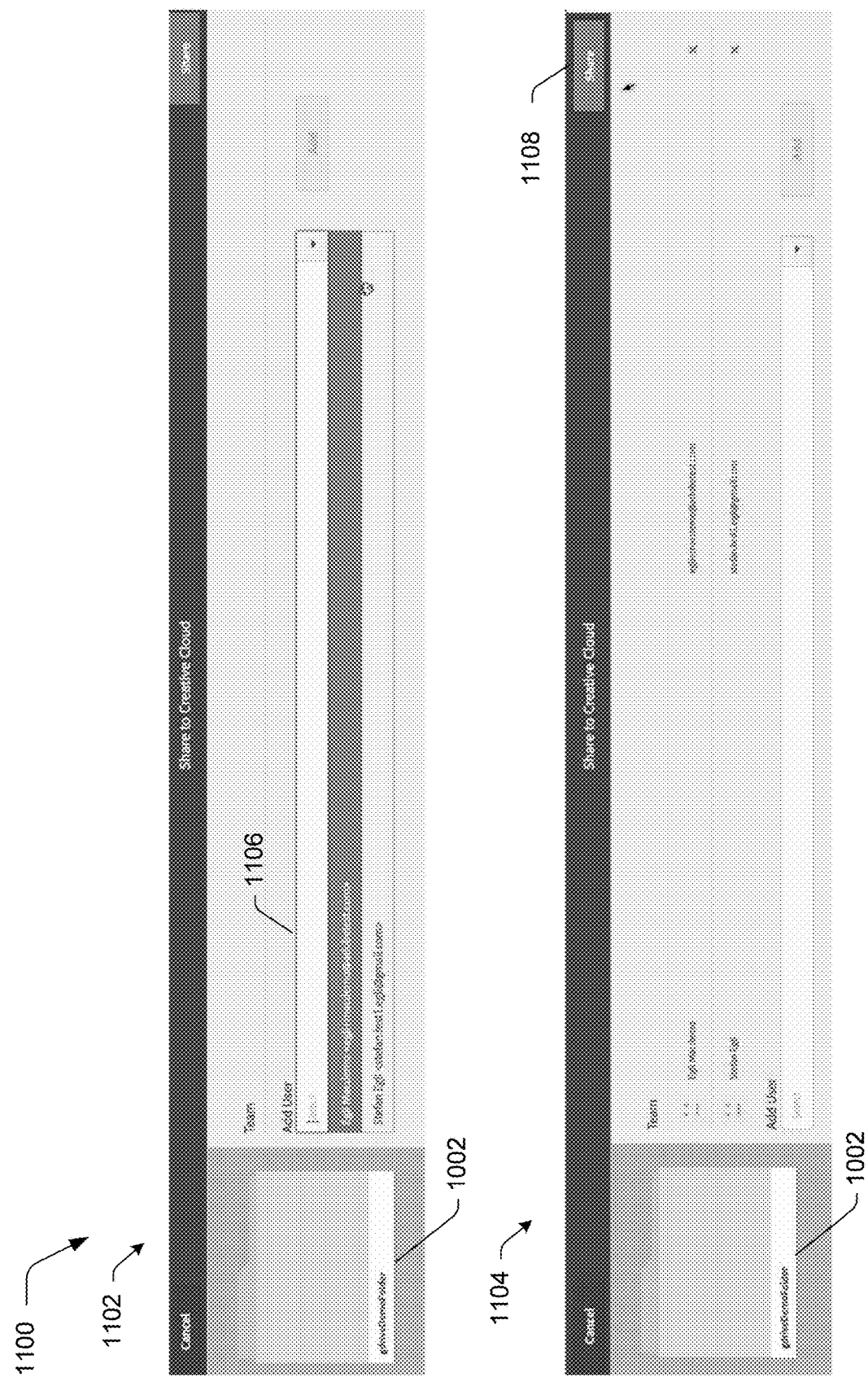
FIG. 11 depicts an example user interface that is output responsive to selection of the option to grant user access of FIG. 10.

FIG. 11 depicts an example user interface 1100 that is output responsive to selection of the option 1004 to grant user access of FIG. 10. First and second examples 1102, 1104 of the user interface 1100 are illustrated in this instance. In the first example 1102, an input portion 1106 is illustrated via which the managing user may specify an additional user to be granted access to the shared network resource, which may include auto-populate techniques to help "fill in" a user's email address that is to be used to send an invitation usable to access the shared network resource. The input portion 1106 is displayed proximal to a representation of the shared network resource 1002, to which, access is being granted.

At the second example 1104, a user selects an option 1108 to "share" access to the shared network resource. Selection of this option 1108 may cause communications to be sent via the network 106 to the users that may be used to access the shared network resource, such as via login credentials, a link that is selectable to navigate to the shared network resource, text message, instant message, and so forth.

Figure 12:
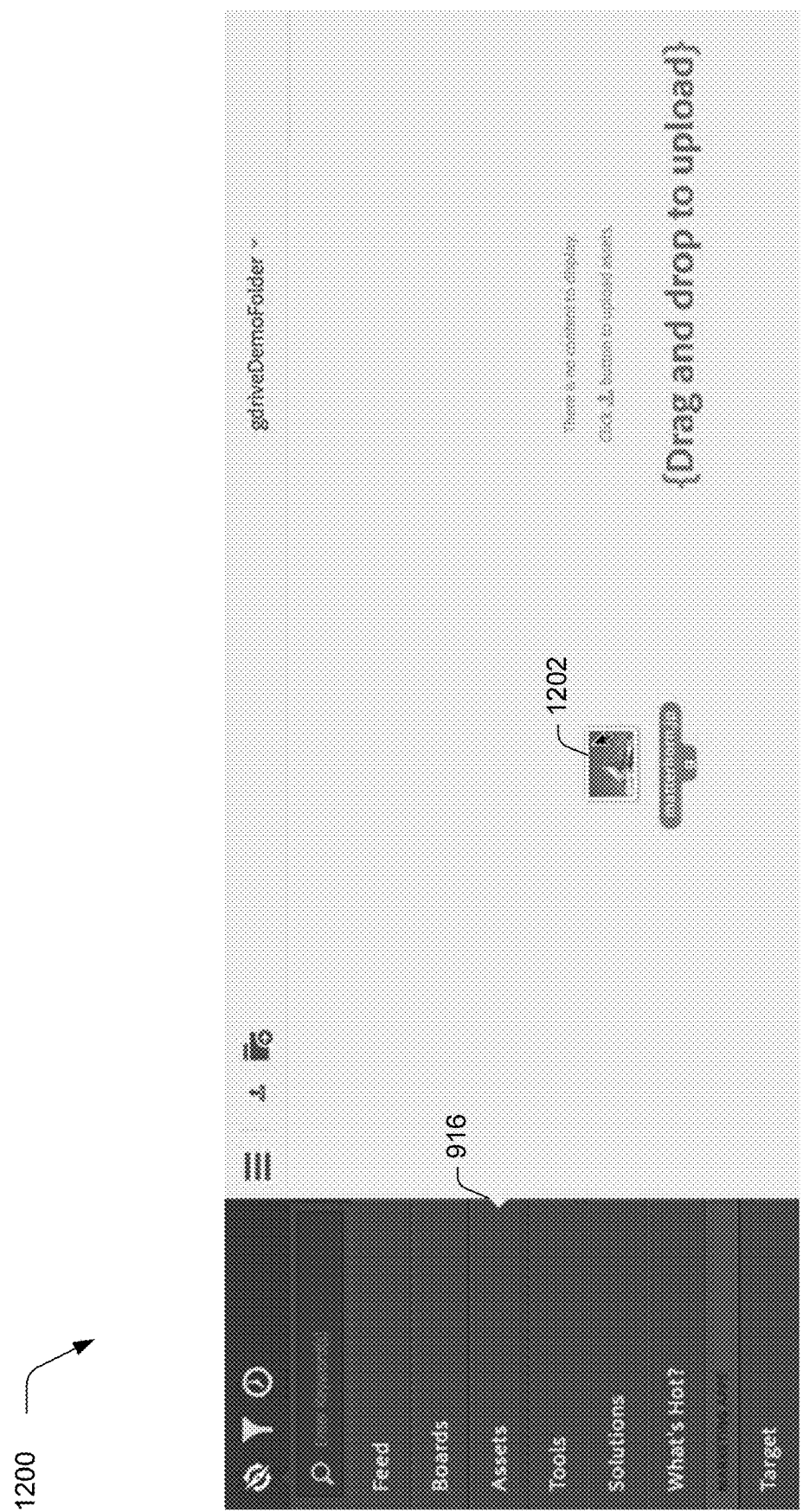
FIG. 12 depicts an example user interface that is configured to accept content for inclusion as part of the shared network resource.

FIG. 12 depicts an example user interface 1200 that is configured to accept content for inclusion as part of the shared network resource. This example user interface 1200 shows the asset view 916 as previously described in relation to FIG. 9. However, in this instance, the user interface has navigated to show files available via that shared network resource and also supports addition of content 1202 to the shared network asset. This may be performed in a variety of ways, such as selection of a "send to" operation, key combination, gesture, a drag-and-drop operation as illustrated, and so on. The content 1202 in this example is illustrated via a representation that includes a thumbnail and name of the content 1202, movement of which supports the drag-and-drop operation.

Figure 13:
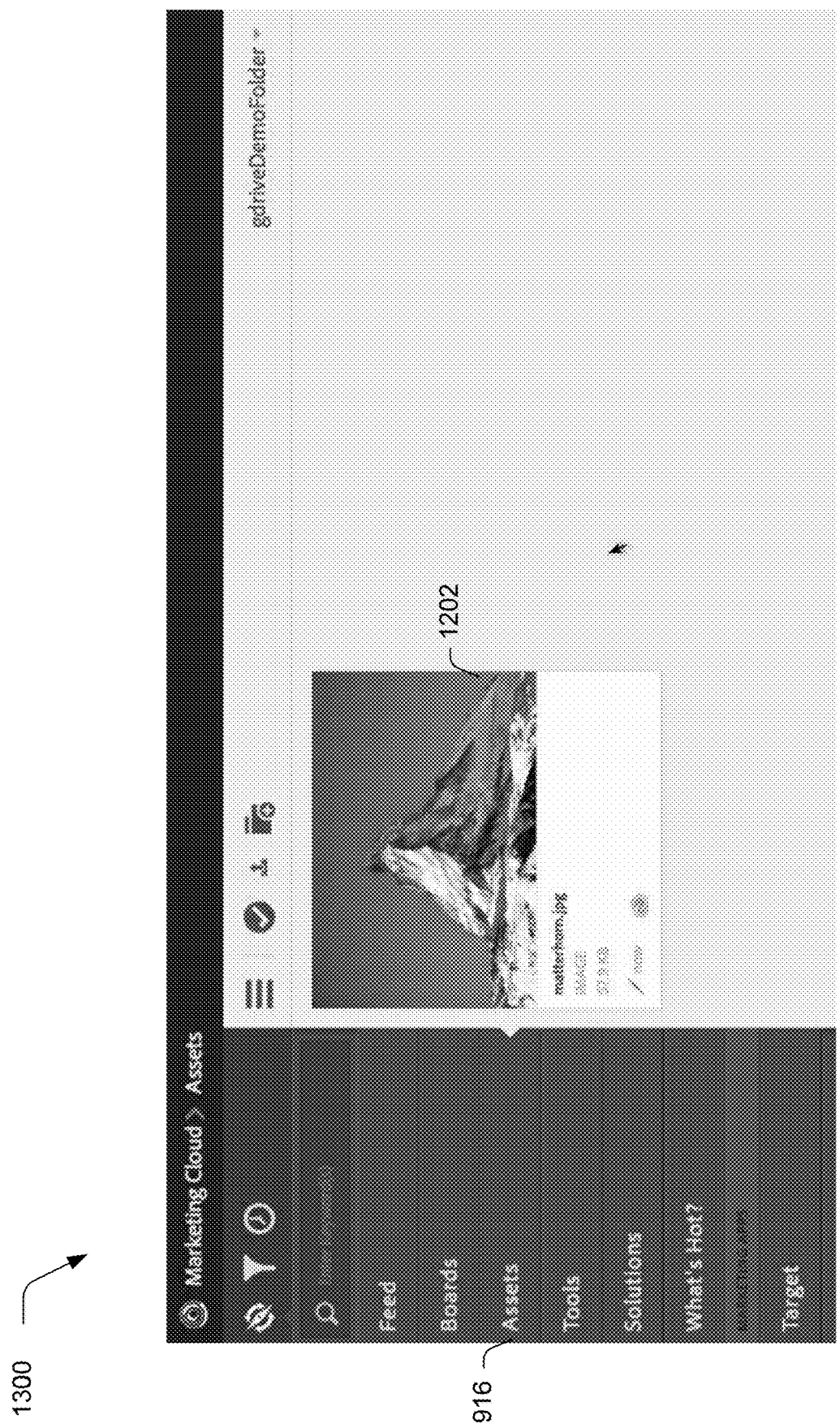
FIG. 13 depicts an example user interface that is output responsive to addition of content to a shared network resource as shown in FIG. 12.

FIG. 13 depicts an example user interface 1300 that is output responsive to addition of content 1202 to a shared network resource as shown in FIG. 12. In this example, the content 1202 has been added to the shared network resource of the content deployment service 104. Once added, a representation of the content 1202 is expanded, which includes a thumbnail of the content, a specification of type, a data storage size, and so forth. A user may then specify how access (e.g., "sharing") of the content 1202 is to be managed, including leveraging of third-party sharing service 802, an example of which is described in the following and is shown in a corresponding figure.

Figure 14:
FIG. 14 depicts an example user interface that is configured to accept input from a managing user to manage access to a shared network resource.

FIG. 14 depicts an example user interface 1400 that is configured to accept input from a managing user to manage access to a shared network resource. In this example, the user interface 1400 includes a link 1402 that is sharable to permit other users (e.g., collaborators using the content creation service 102 and/or the content deployment service 104) to access the shared network resource. In this example, the shared network resource 804 is maintained by a third-party sharing service, such as Google® Drive, Dropbox®, OneDrive®, and so forth.

The user interface 1400 also includes a portion 1404, via which, the managing user may invite other users to access the shared network resource, may set permissions of the users (e.g., read/write, read only, available for download), may set who has control of the shared network resource 804 (e.g., "Is Owner"), and so forth. In this illustrated example, a user given access to edit the content is also given permission to add people and change permissions. Other examples are also contemplated in which this ability is limited solely to a managing user of the shared network resource 804.

Figure 15:
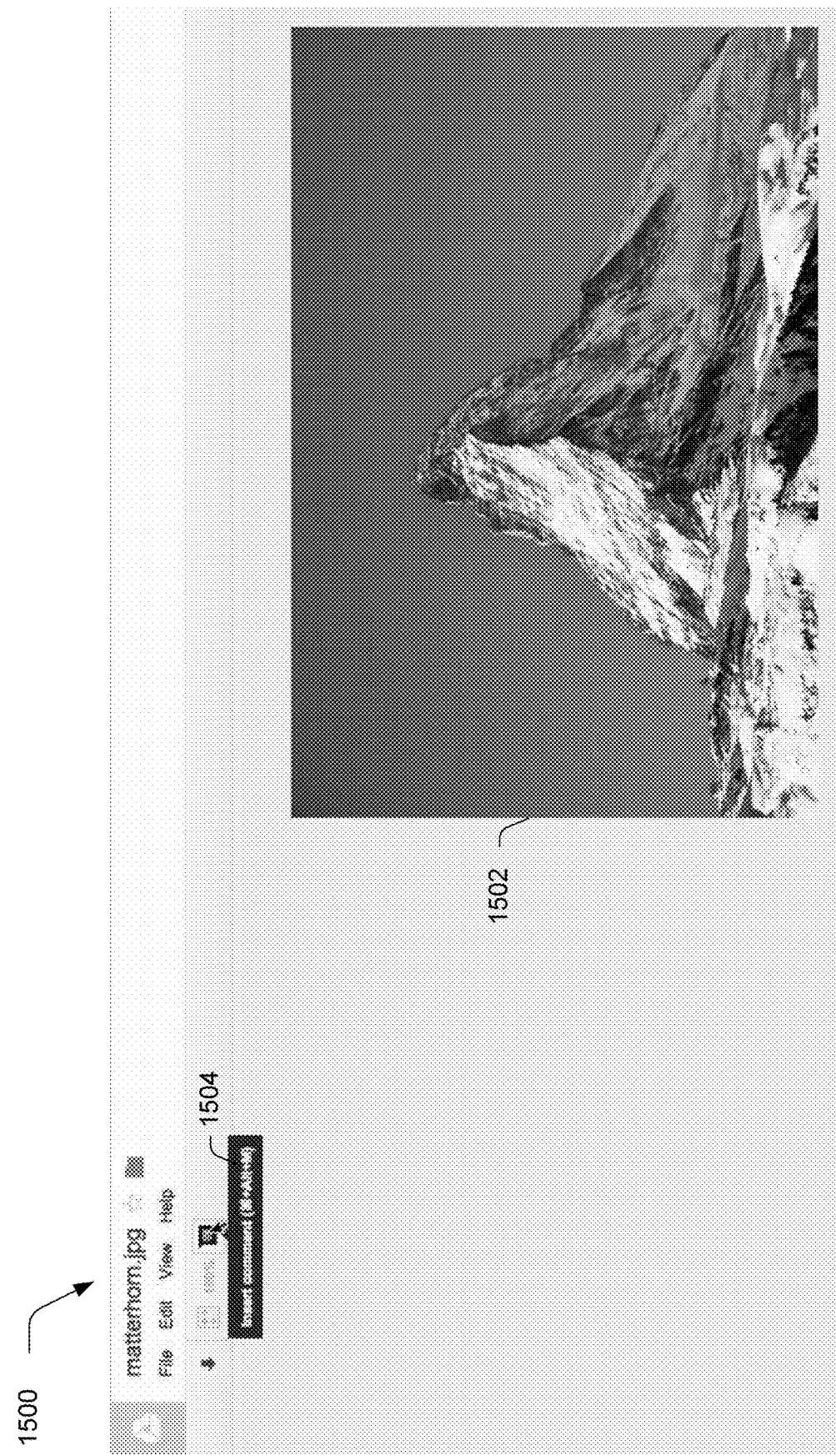
FIG. 15 depicts an example user interface that is configured to initiate comment input in relation to content available via the shared network resource of FIG. 14.

FIG. 15 depicts an example user interface 1500 that is configured to initiate comment input in relation to content available via the shared network resource of FIG. 14. The user interface 1500 in this example includes a display of the content 1502, e.g., an image of the Matterhorn in this instance. The user interface 1500 includes an option 1504 that is selectable to add a comment regarding the content 1502. Other examples of initiating content input include a gesture, key combination, and so on. Responsive to selection, an option is output to accept a comment, which is performable in association with a markup of the content 1502, an example of which is described in the following and is shown in a corresponding figure.

Figure 16:
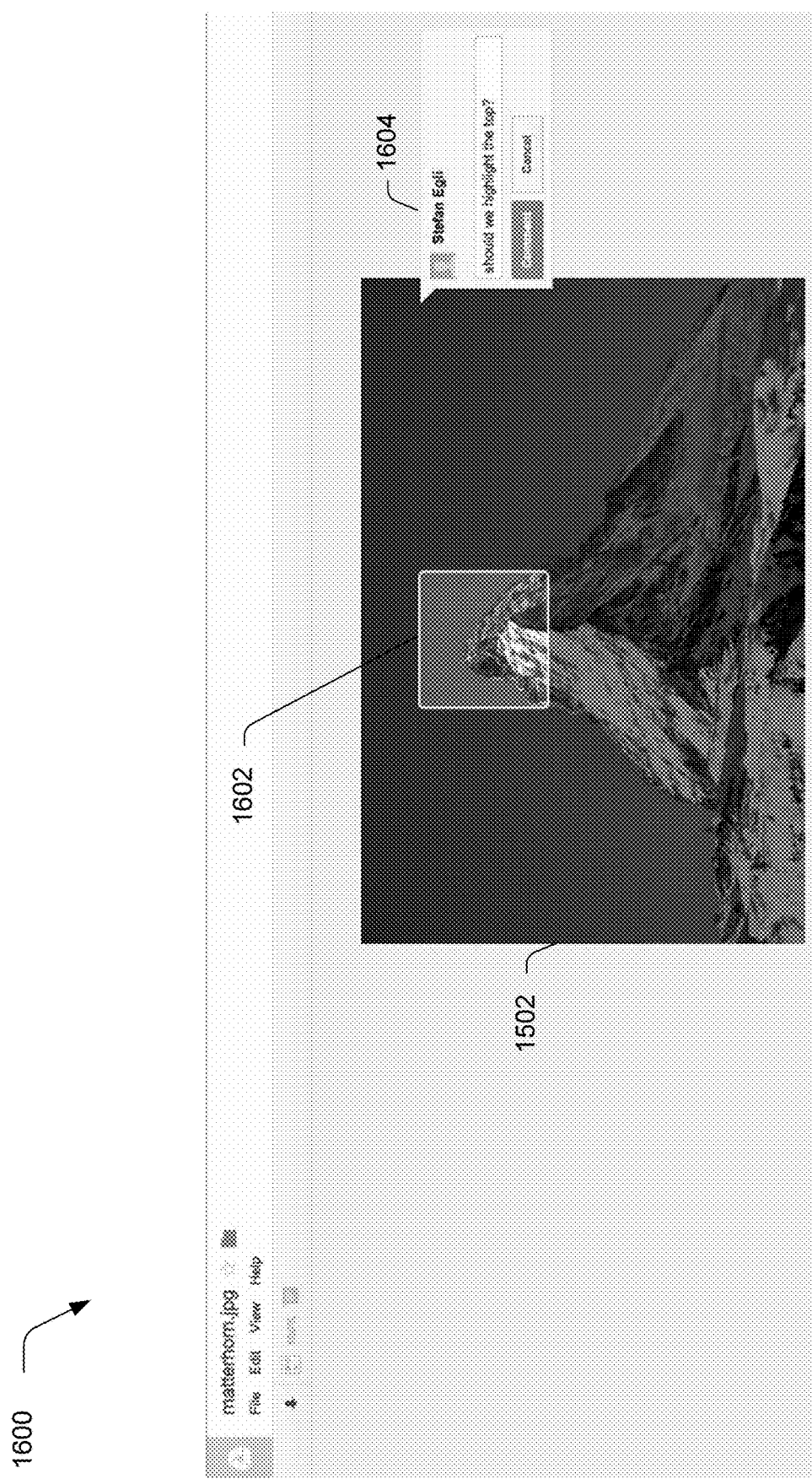
FIGS. 16 and 17 depict example user interfaces that are configured to accept inputs as a comment in relation to content available via the shared network resource via an option output responsive to selection of FIG. 15.
Figure 17:
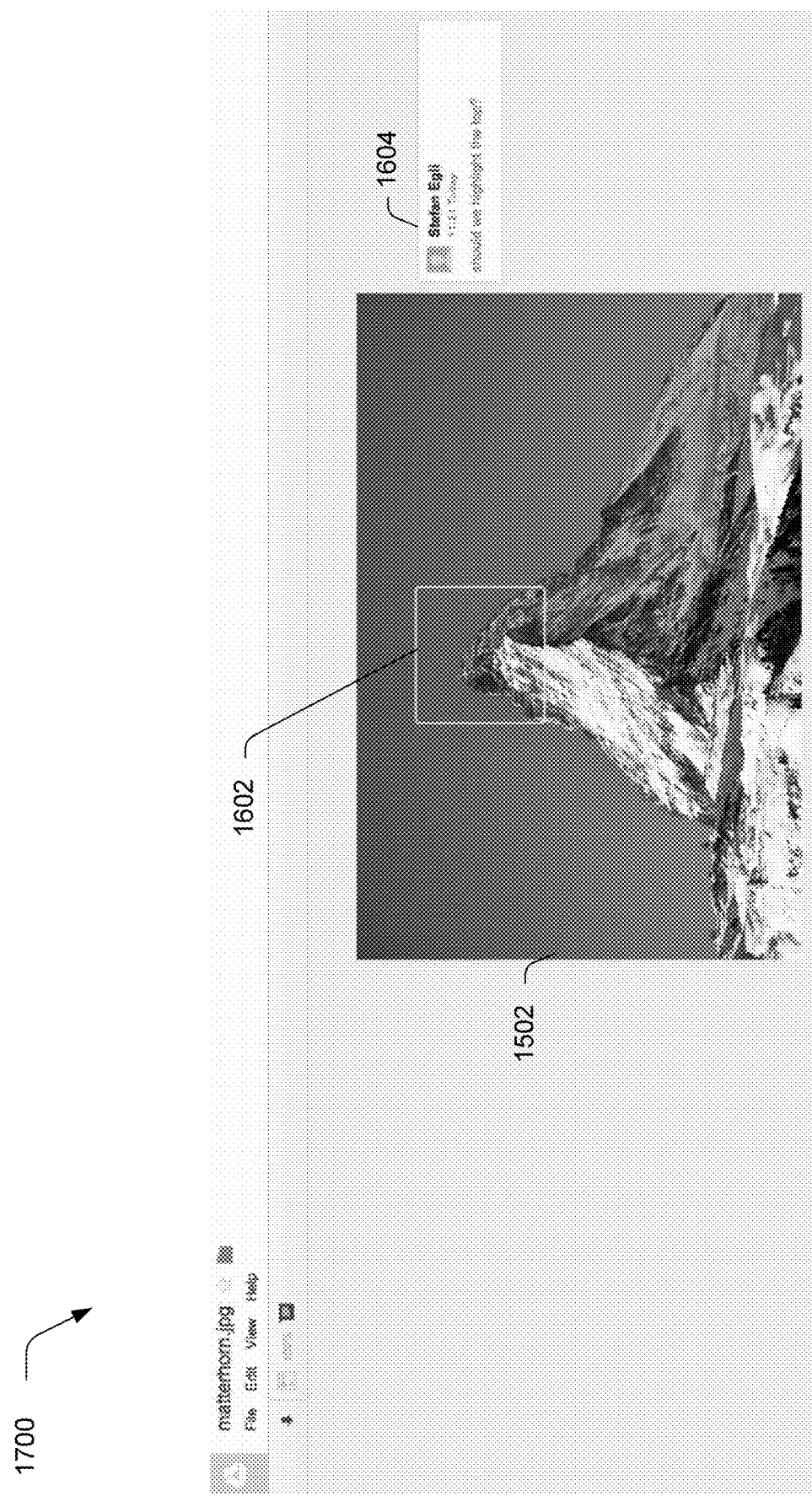

FIGS. 16 and 17 depict example user interfaces 1600, 1700 that are configured to accept inputs as a comment in relation to content available via the shared network resource via an option output responsive to selection of FIG. 15. The user interface 1600 in this example includes a markup 1602 of the content 1502, which is a box drawn around a peak of the mountain. Drawing of this markup 1602 causes output of an option configured to accept a comment 1604 that is to be associated with the markup 1602, e.g., text saying "should we highlight the top?" The comment 1604 and the markup 1602 in FIG. 16 are visually associated, one with another, in this example through use of a color. It should be readily apparent that a variety of other visual associations may also be performed, such as proximity, connecting visual lines, or other visual treatments.

In this way, a user may interact with particular portions of the content 1502 and provide comments relating to those portions, which is saved along with the content as shown in the user interface of FIG. 17. These comments, markups, and content are also shared with other users having access to the shared network resource as part of an activity stream, an example of which is described in the following and is shown in a corresponding figure.

Figure 18:
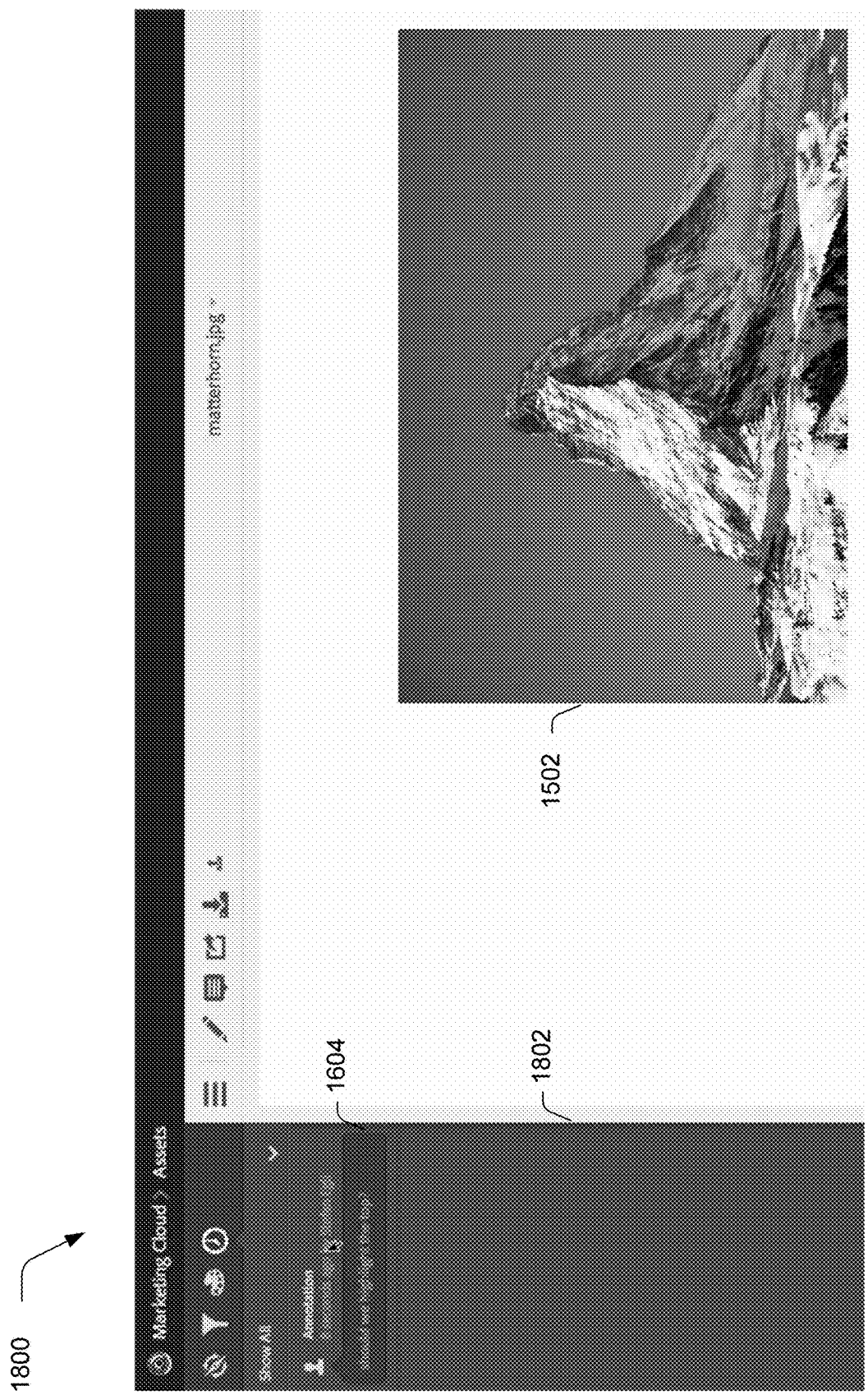
FIG. 18 depicts an example user interface that includes an activity stream that includes comments that may be used to support a workflow for creation and modification of the content.

FIG. 18 depicts an example user interface 1800 that includes an activity stream that includes comments that may be used to support a workflow 808 for creation and modification of the content 1502. The user interface 1800 includes a display of the content 1502 as before, but in this case also includes a concurrent display of an activity stream 1802. The activity stream 1802 is configured to display comments 1604 collected by the deployment manager module 118 from users given access to the shared network resource 804 in real time along with markups made to the image 1502.

For example, any of the users granted access to shared network resource 804 may view the activity stream to view the comment 1604 along with an indication of who made the comment in real time in the activity stream 1604. Selection of the comment 1604 may cause output of the markup 1602 shown in FIG. 16. Additional comments also be made by that user or other users and viewed in real time as part of the activity stream. Further, these comments may be included as part of a workflow 808 as previously described to guide creation of the content 1502. An example of input of another comment is described in the following and is shown in a corresponding figure.

Figure 19:
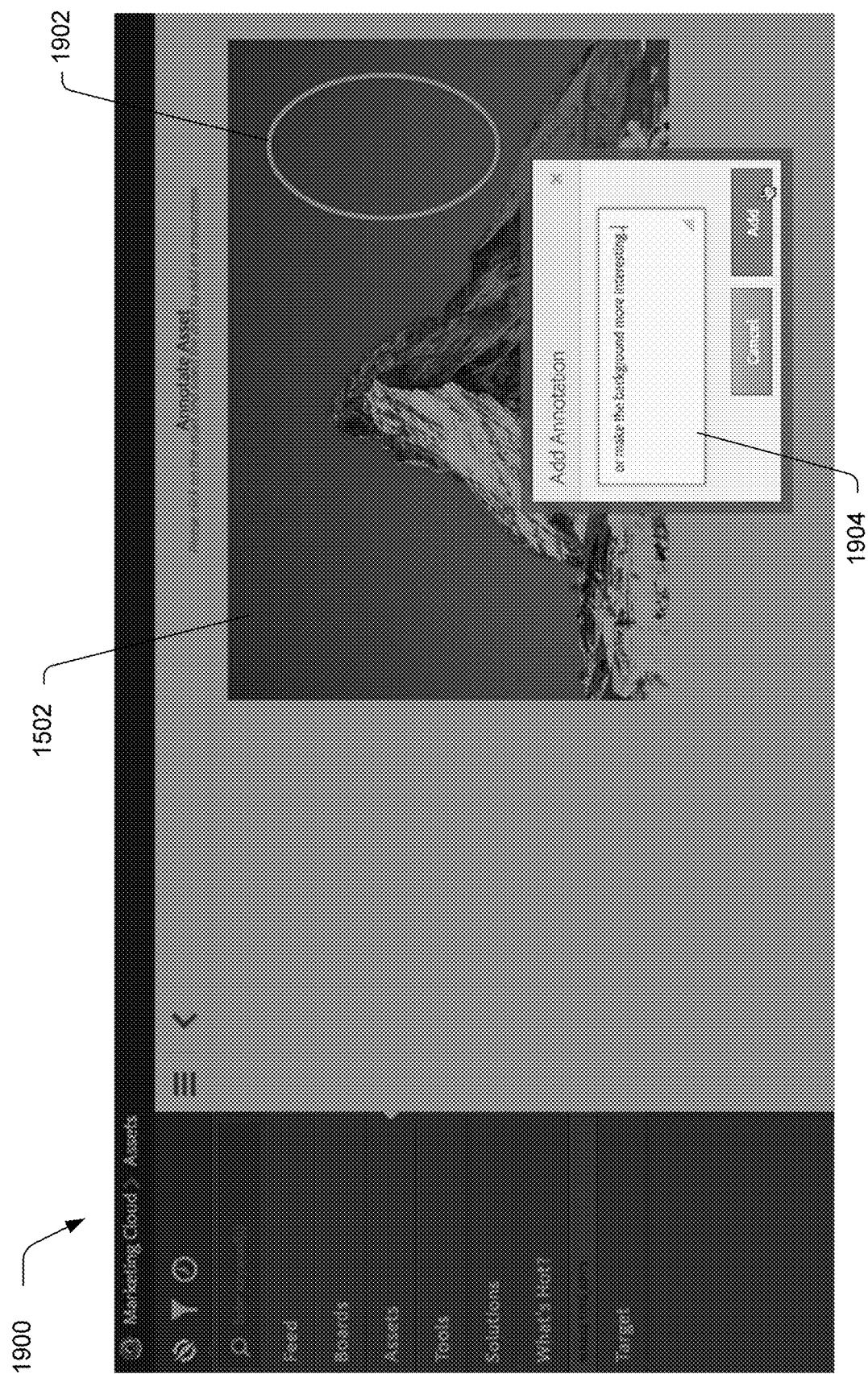
FIG. 19 depicts another example user interface that is also configured to accept inputs as a comment in relation to content available via the shared network resource.

FIG. 19 depicts another example user interface 1900 that is also configured to accept inputs as a comment in relation to content available via the shared network resource. In this example, the content 1502 is also displayed in the user interface 1900. A user inputs a markup 1902 of the content, which causes output of an option to input a comment 1904, e.g., "or make the background more interesting." As illustrated, focus is given to the option when ready to receive text, e.g., by "graying out" the content 1502 and other portions of the user interface 1900. Selection of "Add" in the user interface may then cause this markup 1902 and comment 1904 to be communicated in real time for display to other users as part of an activity stream, an example of which is described as follows and is shown in a corresponding figure.

Figure 20:
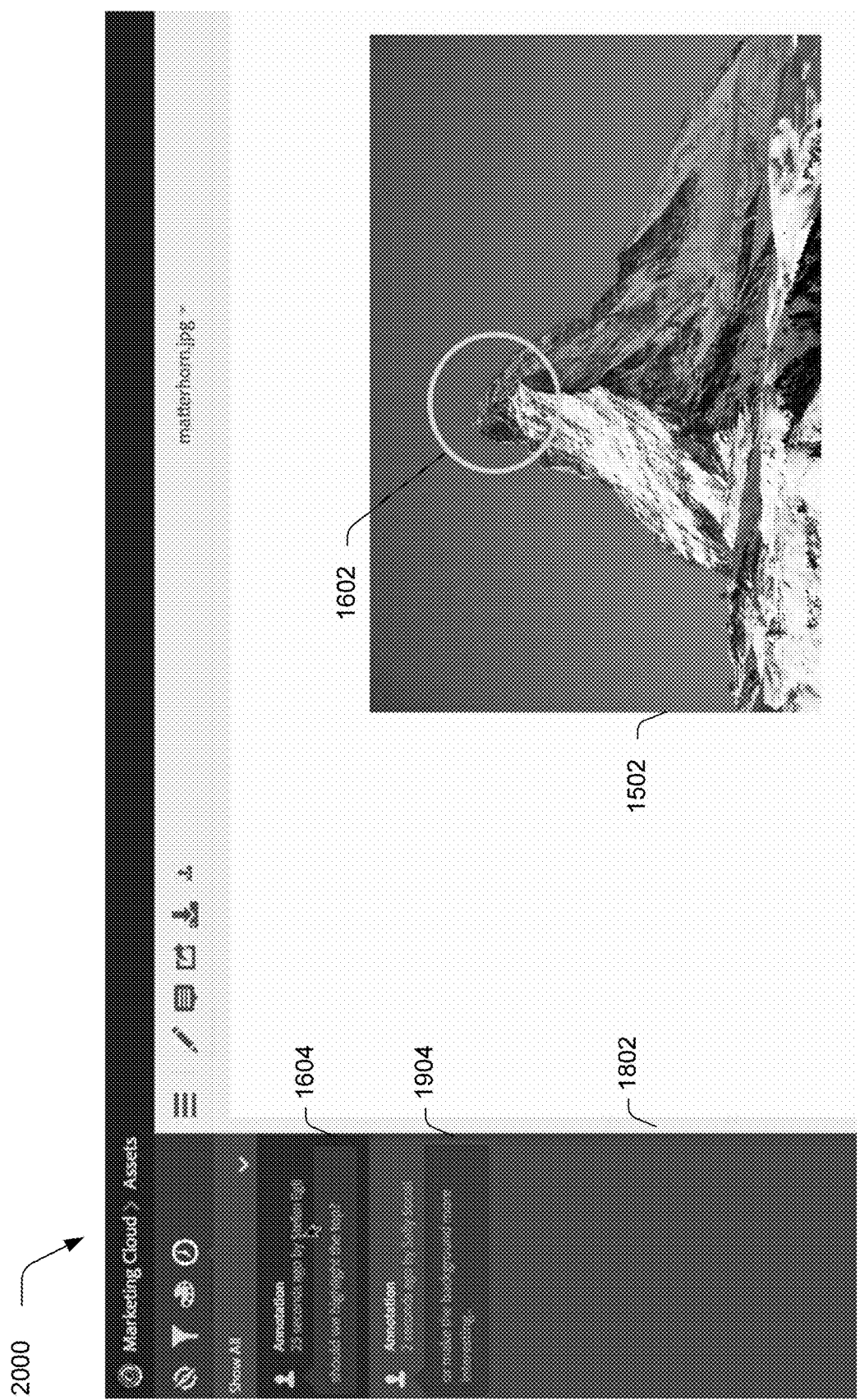
FIG. 20 depicts an example user interface that includes an activity stream that includes comments input as described in FIGS. 16 and 19.

FIG. 20 depicts an example user interface 2000 that includes an activity stream that includes comments input as described in FIGS. 16 and 19. In this example, comment 1604 is included in the activity stream as before. Comment 1904 has also been added. Each of the comments 1604, 1904 also has a corresponding indication of when the comment was made, e.g., how long ago in this example. As illustrated, selection of a corresponding comment 1604 in the activity stream 1802 causes output of a corresponding markup 1602 as previously described.

Figure 21:
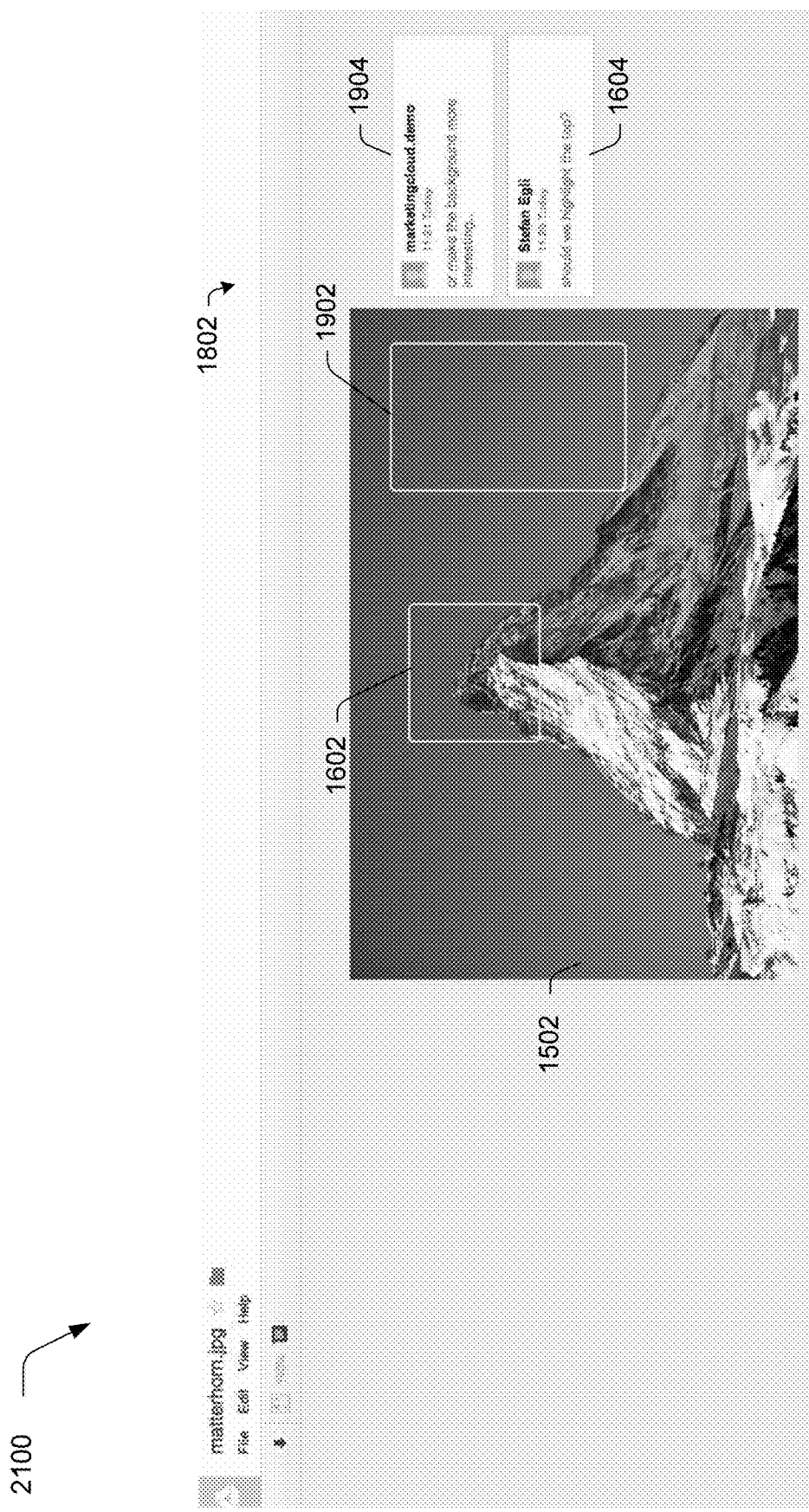
FIG. 21 depicts another example user interface that includes an activity stream that includes comments input as described in FIGS. 16 and 19.

FIG. 21 depicts another example user interface 2100 that includes an activity stream that includes comments input as described in FIGS. 16 and 19. In this example, the activity stream 1802 having the comments 1604, 1904 is shown in another configuration concurrently with corresponding markups 1602, 1902 that are displayed without involving selection of the corresponding comments 1604, 1904.

Figure 22:
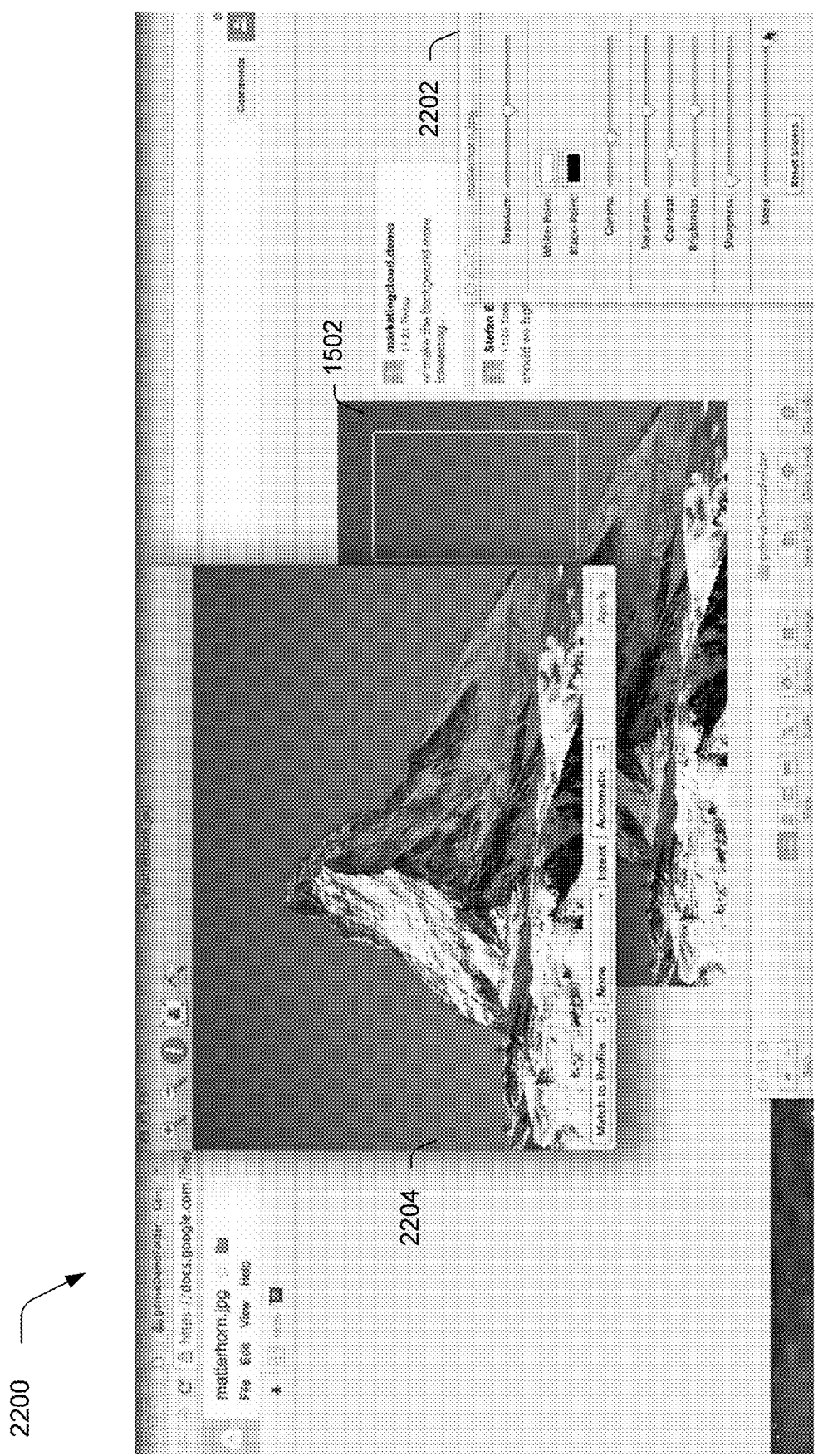
FIG. 22 depicts an example user interface showing selection an application of an image editing operation to the content.

FIG. 22 depicts an example user interface 2200 showing selection an application of an image editing operation to the content 1502. In this example, a user given access to the shared network resource 804 through the content creation service 102 causes execution of one or more image editing operations 2202 to the content 1502. A result of this execution is shown as content 2204.

Figure 23:
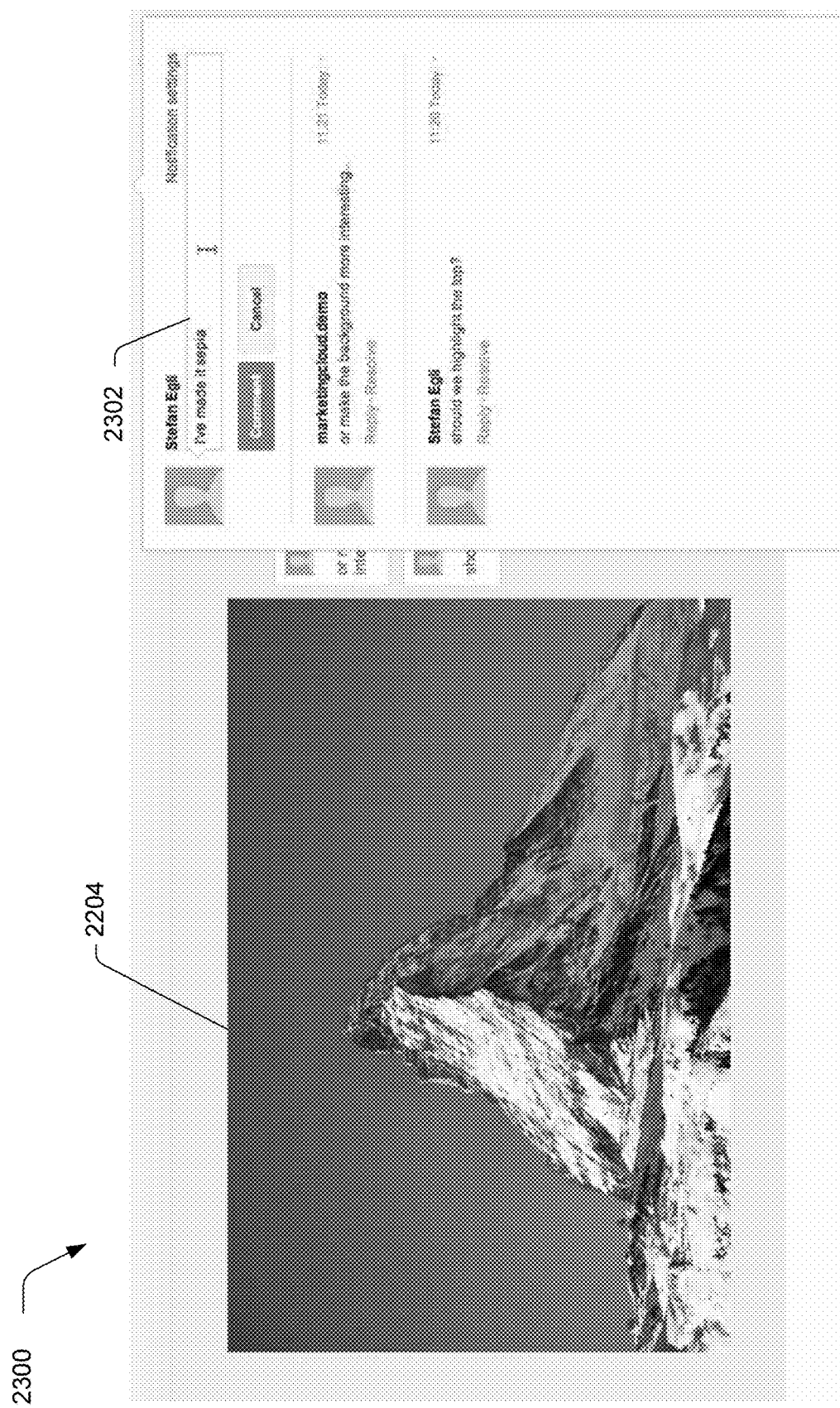
FIG. 23 depicts an example user interface showing input of a comment associated with an image editing operation.
Figure 24:
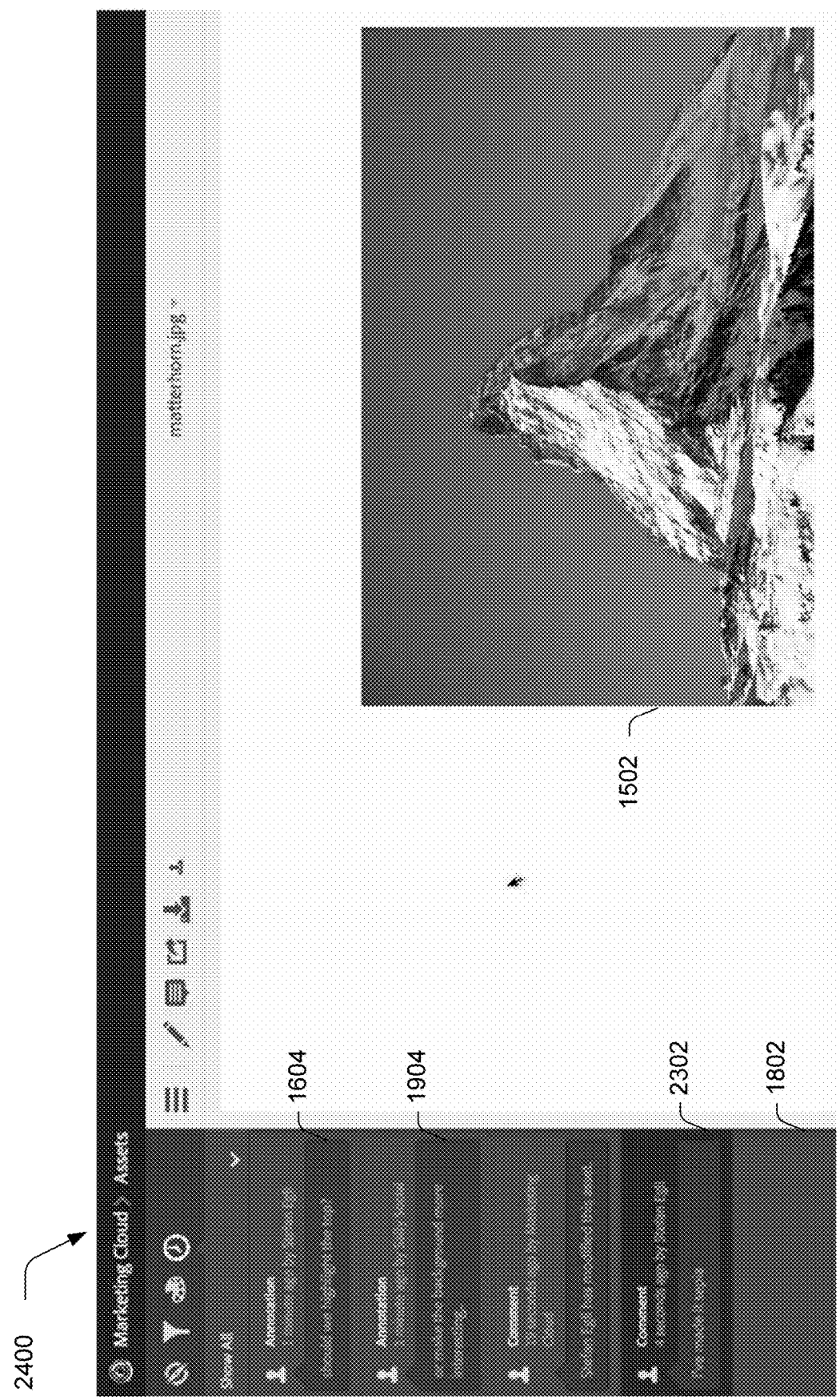
FIG. 24 depicts an example user interface showing an activity stream that includes comments from FIGS. 16, 19 and 23.

The user may then add a comment 2302 as shown in the user interface 2300 of FIG. 23, which in this instance describes the image editing operation performed. Like before, the comment 2302 and the content 2204 are communicated in real time for inclusion in an activity stream 1802 of a user interface 2400 as shown in FIG. 24. In this way, the activity stream facilitates a workflow between marketers and content creators, further discussion of which is described in relation to the following procedures.

Example Procedures

The following discussion describes content creation and deployment collaboration techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-24.

Figure 25:
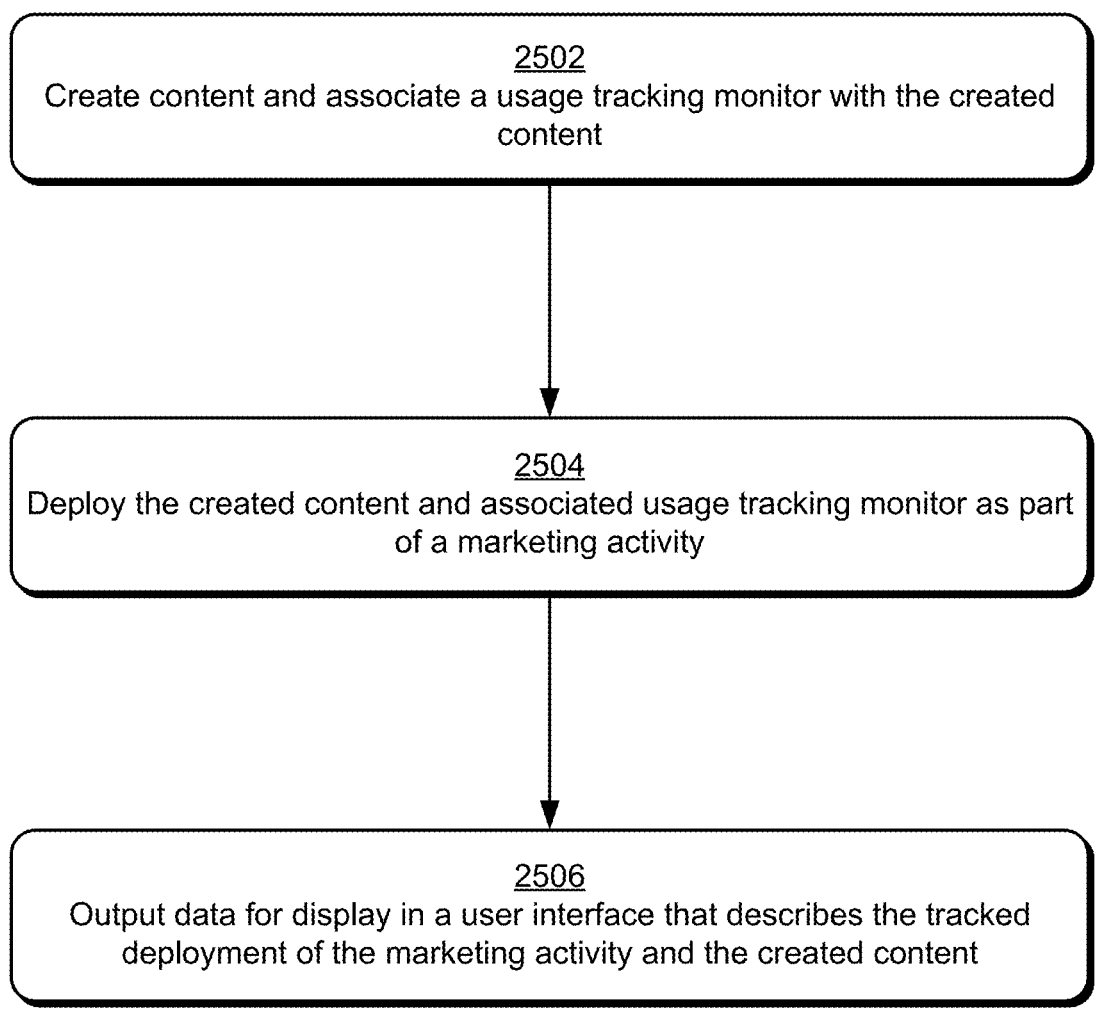
FIG. 25 is a flow diagram depicting a procedure in an example implementation in which content is created and the deployment of which is tracked as part of a marketing activity.

FIG. 25 depicts a procedure 2500 in an example implementation in which content is created and the deployment of which is tracked as part of a marketing activity. Content is created and a usage tracking monitor is associated with the created content (block 2502). A content creator, for instance, may utilize a content capture device 208, interact with applications of a content creation service 102, and so on to create content. The content may be associated with a tracking monitor 310 to track deployment of the content 114, such as collect deployment data 122 describing a number of views of the content 114.

The created content and associated usage tracking monitor are deployed as part of a marketing activity (block 2504). This includes deployment as part of an online or offline marketing activity, e.g., emails, banner ads, flyers, and so forth.

Data is output for display in a user interface that describes the tracked deployment of the marketing activity and the created content (block 2506). The data describes a number of times interaction with the content occurred as well as how this interaction occurred, e.g., by whom, when, where, and so on. This data is then output in real time to give feedback to the content creator, marketer, and so forth.

Figure 26:
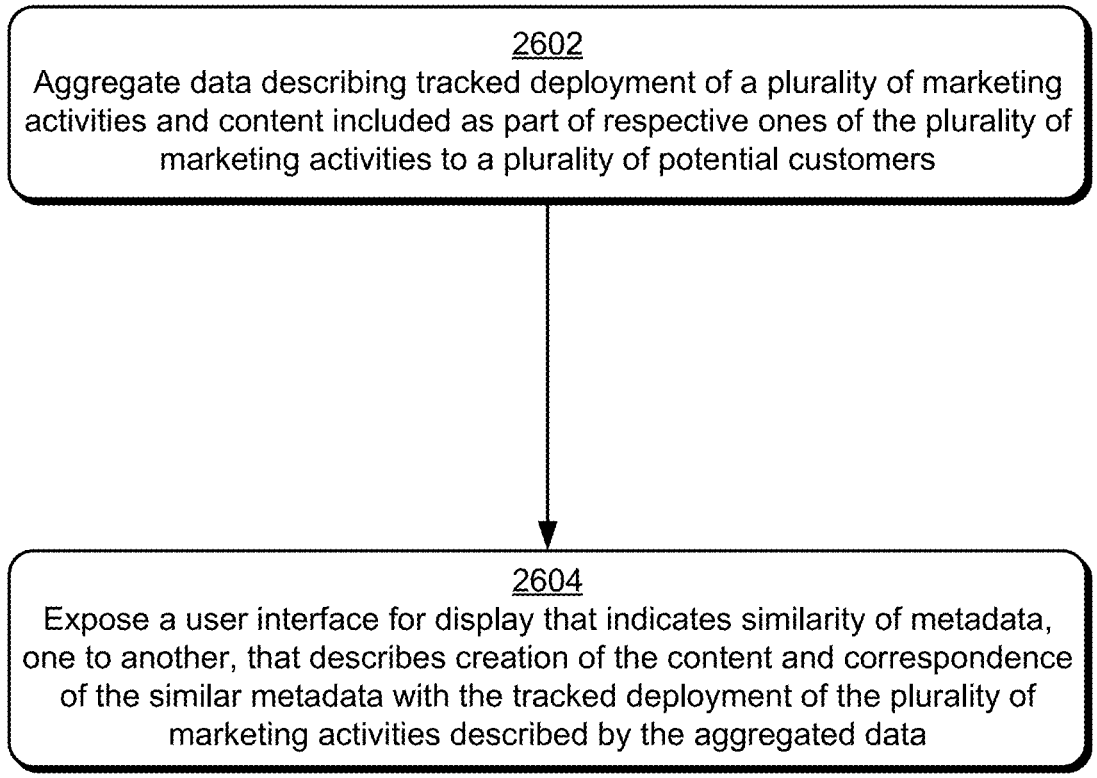
FIG. 26 is a flow diagram depicting a procedure in an example implementation in which data is aggregated to indicate similarities of metadata and tracked deployment of content as part of marketing activities.

FIG. 26 depicts a procedure 2600 in an example implementation in which data is aggregated to indicate similarities of metadata and corresponding tracked deployment of content as part of marketing activities. Data is aggregated that describes tracked deployment of a plurality of marketing activities as well as content included as part of respective ones of the plurality of marketing activities to a plurality of potential consumers (block 2602). Like the previous example, the data may be configured as deployment data 122 that describes how content is created as well as how that content is deployed and interacted with as part of marketing activities.

A user interface is exposed for display that indicates similarity of metadata, one to another, that describes creation of the content and correspondence of the similar metadata with the tracked deployment of the plurality of marketing activities described by the aggregated data (block 2604). The user interface, for instance, describes content having similar characteristics as defined by the metadata along with corresponding deployment data 122. In this way, commonalties are observed that are useful in design of future content and marketing activities.

Figure 27:
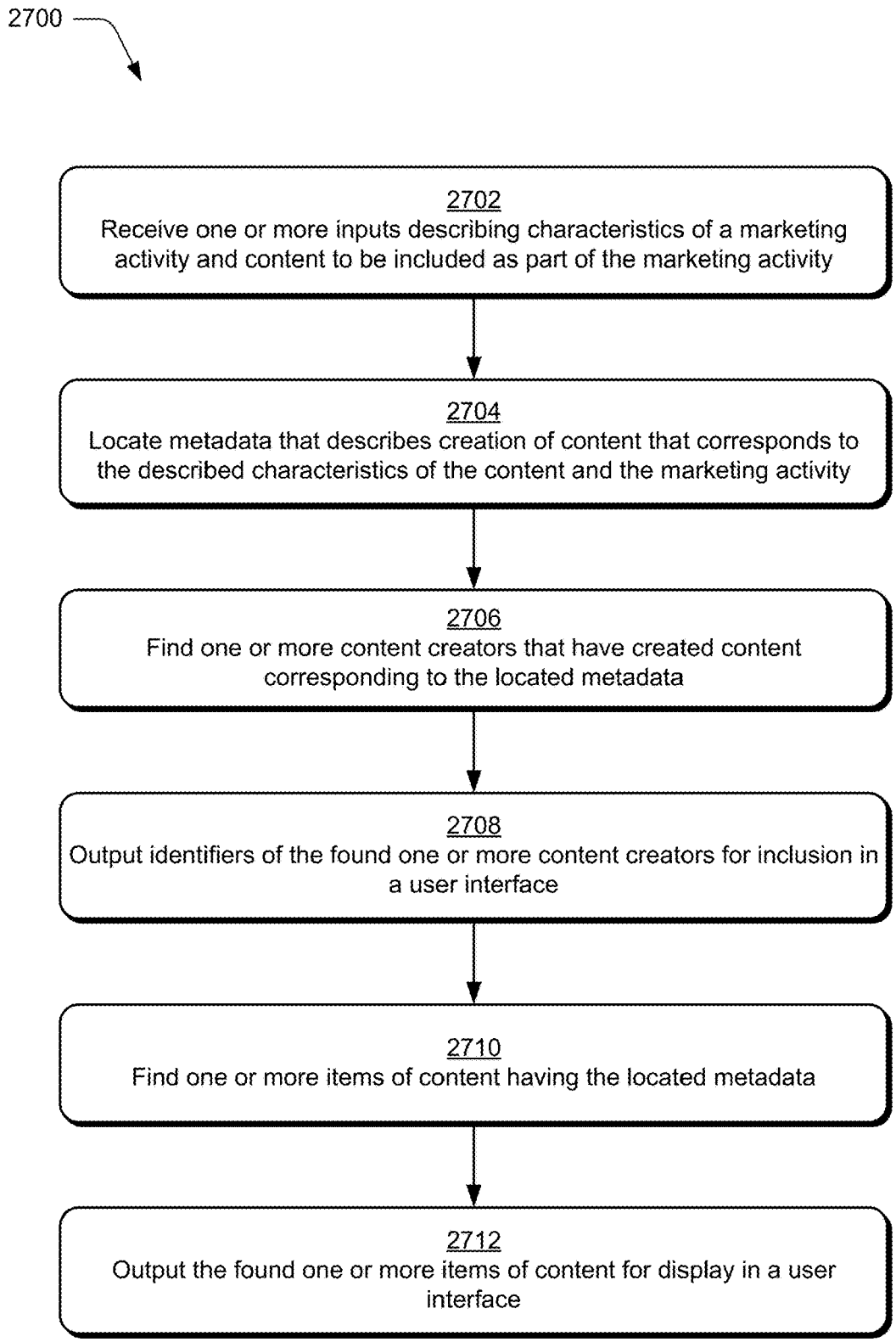
FIG. 27 is a flow diagram depicting a procedure in an example implementation in which inputs are provided that describe a marketing activity and in response content to be included as part of the marketing activity and content creators are found based on metadata describing creation of content.

FIG. 27 depicts a procedure 2700 in an example implementation in which inputs are provided that describe a marketing activity and content to be included as part of the marketing activity and content creators and content are found based on metadata describing creation of content. One or more inputs are received that describe characteristics of a marketing activity and content to be included as part of the marketing activity (block 2702). A marketer 408, for instance, may provide textual inputs describing a subject of a marketing activity (e.g., shoes, dog food, etc.), where the marketing activity is to be deployed, how the marketing activity is to be deployed, and so on. Inputs may also be provided that describe content for inclusion as part of the marketing activity, e.g., landscape images, objects in the images (e.g., shoes), and so forth. In another example, a marketer 408 selects (e.g., drag and drop) examples of content having characteristics that are desirable by the marketer, but the examples are not actually to be included as part of the marketing activity themselves.

Metadata is located that describes creation of content that corresponds to the described characteristics of the content and the marketing activity (block 2704). The content creation service 102, for instance, leverages metadata 206 and deployment data 122 to locate characteristics of content that correspond to the marketing activity and/or the description of the content, which are utilized to support a variety of functionality.

For example, one or more content creators are found that have created content corresponding to the located metadata (block 2706). Identifiers are output of the found one or more content creators for inclusion in a user interface (block 908). For instance, the located metadata may be utilized in a search to find content creators that are part of an online social-media based portfolio service that have created similar content. Identifiers of these content creators may then be output automatically and without user intervention such that the marketer may make offers to these content creators to create desired content and thus improve the likelihood that the content will be successful as part of the marketing activity.

In another example, one or more items of content are found having the located metadata (block 2710). The found one or more items of content are output for display in a user interface (block 2712). In this example, items of content themselves may be located that are suitable for inclusion as part of the marketing activity. In this way, correspondence of the deployment data 122 and metadata 206 may be leveraged to locate content of interest for inclusion as part of a marketing activity.

Figure 28:
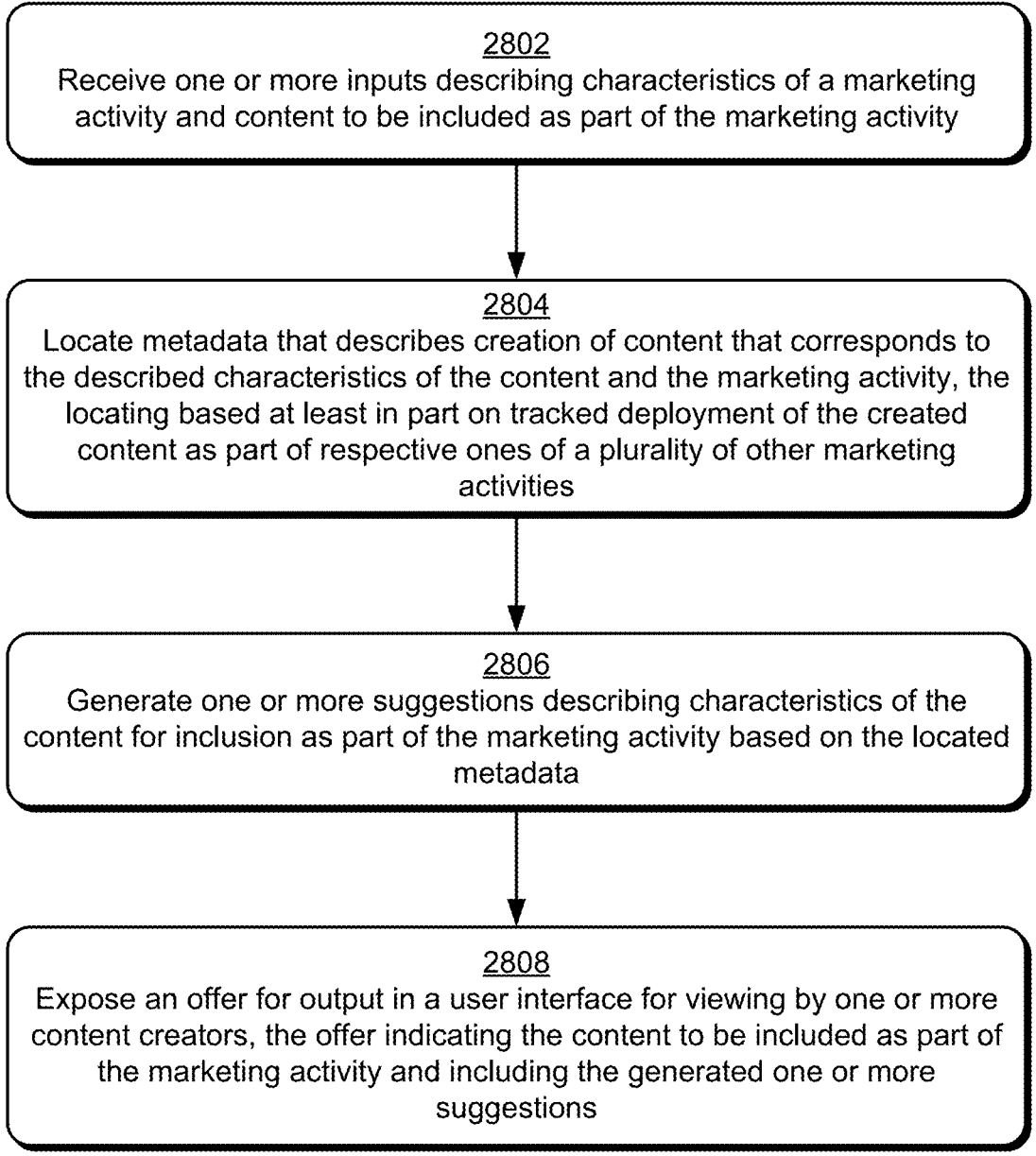
FIG. 28 is a flow diagram depicting a procedure in an example implementation in which suggestions are generated for content to be included as part of a marketing activity responsive to inputs that are received that describe the marketing activity.

FIG. 28 depicts a procedure 2800 in an example implementation in which suggestions are generated for content to be included as part of a marketing activity responsive to inputs that are received that describe the marketing activity. One or more inputs are received that describe characteristics of a marketing activity and content to be included as part of the marketing activity (block 2802). As before, a marketer 408 may provide textual inputs describing a subject of a marketing activity (e.g., shoes, dog food, etc.), where the marketing activity is to be deployed, how the marketing activity is to be deployed, may select examples of content to be included, and so on.

Metadata is located that describes creation of content that corresponds to the described characteristics of the content and the marketing activity, the locating based at least in part on tracked deployment of the created content as part of respective ones of a plurality of other marketing activities (block 2804). One or more suggestions are generated that describe characteristics of the content for inclusion as part of the marketing activity based on the located metadata (block 2806). For example, metadata 206 is located that describes creation of content 114 that has been successfully deployed as part of a marketing activity. Commonalities of metadata 206 exhibited as part of this successful deployment may serve as a basis for configuring suggestions describing characteristics of the content to be included as part of a subsequent marketing activity.

An offer is exposed for output in a user interface for viewing by one or more content creators, the offer indicating the content to be included as part of the marketing activity and including the generated one or more suggestions (block 2808). The offer, for instance, may be output as part of an online social-media based portfolio service and include a description of the content to be created as well as the suggestions. In this way, the suggestions may be used as a guide by content creators to increase a likelihood of success of created content as part of a marketing activity. Other examples are also contemplated, such as to configure an offer to be communicated directly to content creators, a tool that is accessible by content creators for processing an offer to obtain the suggestions, and so forth.

FIG. 29 depicts a procedure 2900 in an example implementation in which content is deployed and tracked using a usage tracking monitor. A content creation service is accessed via a network to create content, the content creation service implemented by one or more computing devices and configured to associate metadata with the content, automatically and without user intervention, that is indicative of characteristics of how the content is created as part of the content creation service (block 2902) and in this way is usable to track not only the content but also how the content was created through the digital environment described in relation to FIG. 1. The content creation service 102, for instance, may include a variety of applications that support a variety of functionality that may be utilized to create content "from scratch," edit captured content, and so forth as previously described in relation to FIG. 2.

The content is caused to be communicated by the content creation service for deployment by a content deployment service as part of a marketing activity, the content including a usage tracking monitor as part of the deployment that is usable to cause data to be collected that describes the deployment of the content as part of the marketing activity (block 2904). The client device 106, for instance, may interact with the content creation service 102 and select functionality to publish the content 114 as part of a marketing activity 308. The content 114 may include a tracking monitor 310 that is usable to track deployment of the content, such as how interaction is performed by potential consumers 312, a number of interactions, and so forth.

FIG. 30 depicts a procedure 3000 in an example implementation in which badges are associated with a user profile and an item of content that are indicative of deployment of content created by the content creator as part of marketing activities. Functionality is exposed that is accessible to a content creator via a network to create content (block 3002), such as through interaction with the content creation service 102 of FIG. 1.

A badge may be associated with a user profile of the content creator in a user interface of the content creation service that is indicative of deployment of content created by the content creator as part of one or more marketing activities (block 3004). A badge may also be associated with the content in a user interface of the content creation service that is indicative of deployment of the content as part of one or more marketing activities (block 3006). As shown in FIG. 6, for instance, a badge may be configured to indicate a particular one of a plurality of levels (e.g., by a corresponding number of trophies), may include a counter, and so forth. These badges may be utilized to encourage participation by content creators as part of the online social-media based portfolio service as well as marketers in determining a reputation of content creators to locate content creators of interest.

Figure 31:
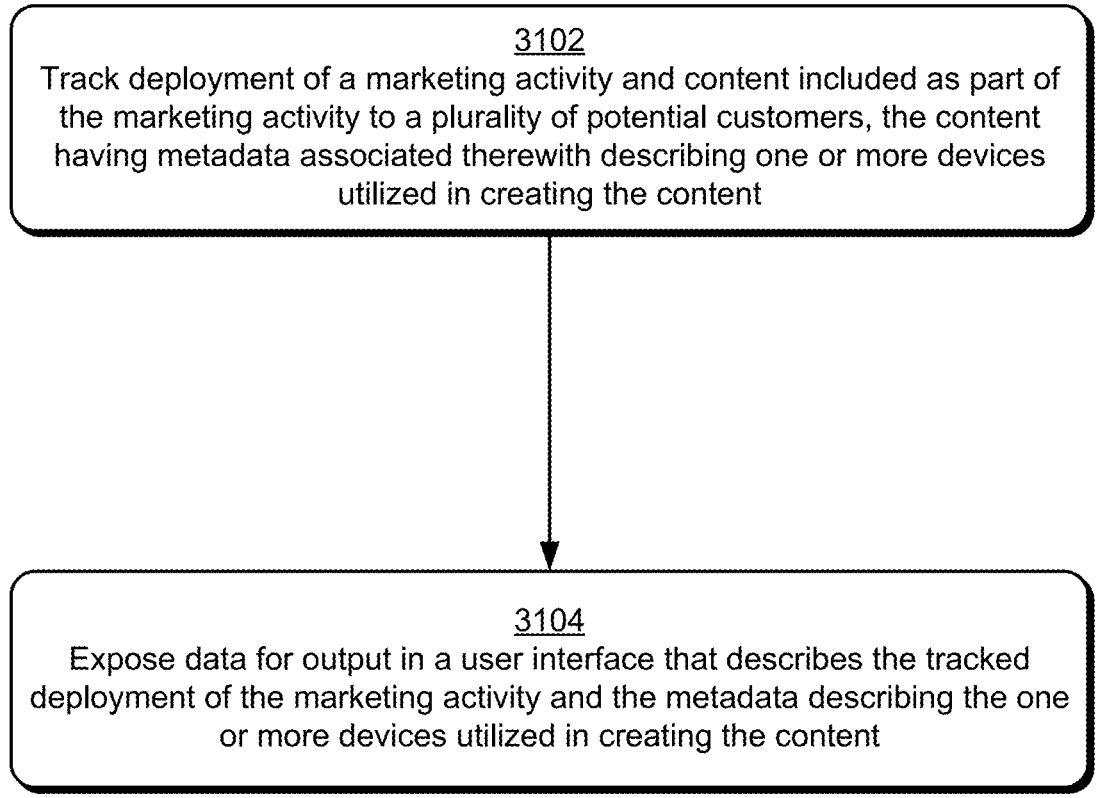
FIG. 31 is a flow diagram depicting a procedure in an example implementation in which deployment of a marketing activity and content is tracked and data is exposed for output in a user interface describing one or more devices utilized in creating the content.

FIG. 31 depicts a procedure 3100 in an example implementation in which deployment of a marketing activity and content is tracked and data is exposed for output in a user interface describing one or more devices utilized in created the content. Deployment of a marketing activity and content included as part of the marketing activity to a plurality of potential consumers is tracked, the content having metadata associated therewith describing one or more devices utilized in creating the content (block 3102). A content creator, for instance, may utilize a content capture device as part of content creation. Metadata 206 may then be associated with the created content 114 which may describe the content capture device, accessories of the content capture device, and settings employed by the content capture device in capturing the content.

Data is exposed for output in a user interface that describes the tracked deployment of the marketing activity and the metadata describing the one or more devices utilized in creating the content (block 3104). The data, for instance, may be exposed to other content creators, retailers, and/or manufacturers to guide future usage and design of the devices, e.g., to notice particular zoom levels utilized, resolutions that are desirable, and so on that may be utilized to design and use future devices.

Figure 32:
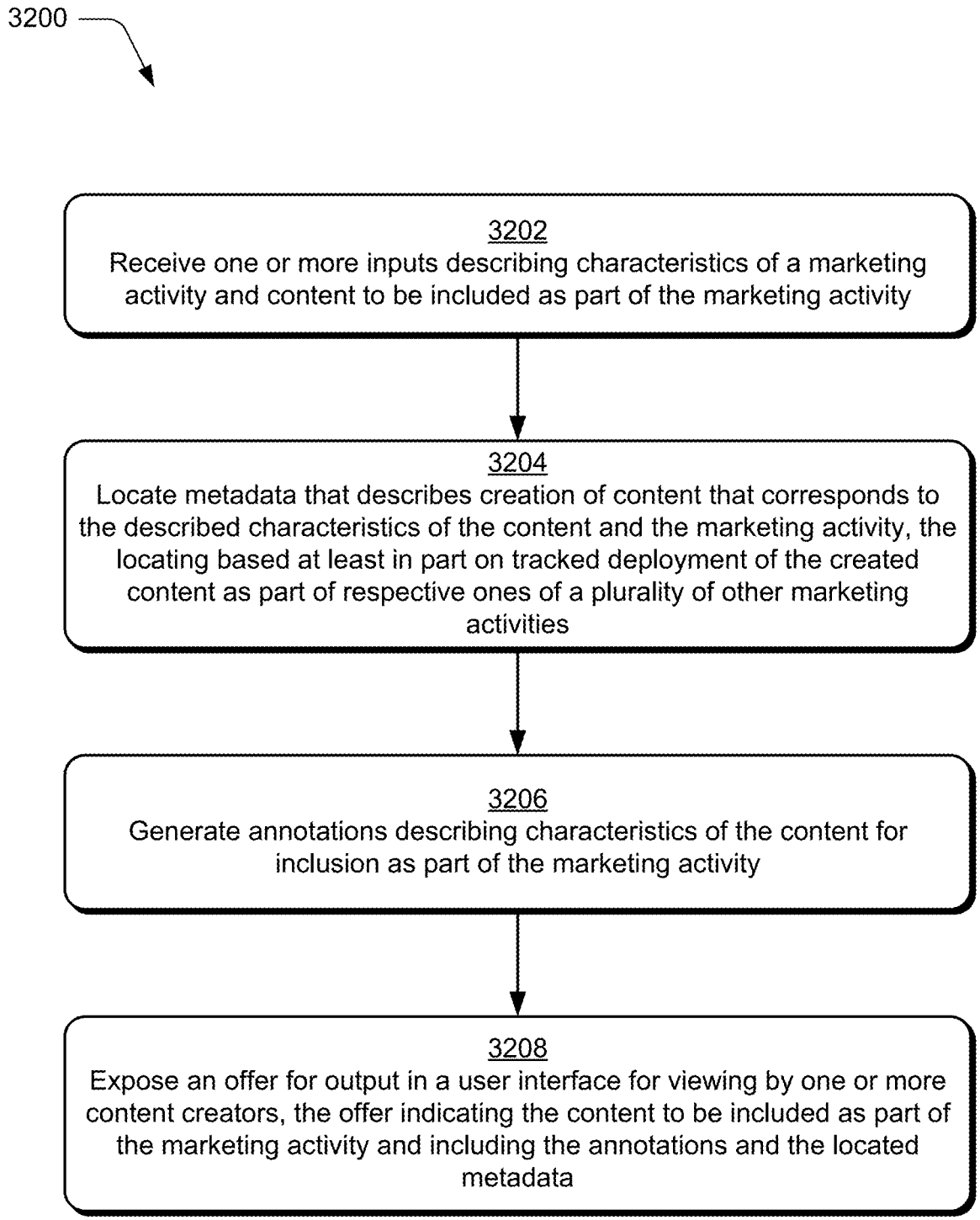
FIG. 32 is a flow diagram depicting a procedure in an example implementation in which annotations are generated for content to be included as part of an offer for content to be included as part of a marketing activity.

FIG. 32 depicts a procedure 3200 in an example implementation in which annotations are generated for content to be included as part of an offer for content to be included as part of a marketing activity. One or more inputs are received that describe characteristics of a marketing activity and content to be included as part of the marketing activity (block 3202). As before, a marketer 408 may provide textual inputs describing a subject of a marketing activity (e.g., shoes, dog food, etc.), where the marketing activity is to be deployed, how the marketing activity is to be deployed, may select examples of content to be included, and so on.

Metadata is located that describes creation of content that corresponds to the described characteristics of the content and the marketing activity, the locating based at least in part on tracked deployment of the created content as part of respective ones of a plurality of other marketing activities (block 3204). For example, metadata 206 may be located that describes creation of content 114 that has been successfully deployed as part of a marketing activity. Commonalities of metadata 206 exhibited as part of this successful deployment may service as a basis for configuring suggestions describing characteristics of the content to be included as part of a subsequent marketing activity.

One or more annotations are generated that describe characteristics of the content for inclusion as part of the marketing activity (block 3206). A marketer 408, for instance, may annotate examples of the content to be included as part of the marketing activity to indicate changes to be made, characteristics that are desirable, and so on.

An offer is exposed for output in a user interface for viewing by one or more content creators, the offer indicating the content to be included as part of the marketing activity and including the annotations and the located metadata (block 3208). The offer, for instance, may include the metadata as well as the annotations to guide a content creator in the creation of new content for inclusion as part of a marketing activity. A variety of other examples are also contemplated without departing from the spirit and scope thereof.

FIG. 33 depicts a procedure 3300 in an example implementation in which data describing tracked deployment of a plurality of marketing activities is segmented by channel and content within those channels is rated to serve as suggestions for selection of content. Data is received describing tracked deployment of a plurality of marketing activities and content included as part of respective ones of the plurality of marketing activities to a plurality of potential consumers (block 3302). The data, for example, may be configured as deployment data 122 that describes content 114 usage as part of marketing activities as described above.

The data and corresponding content is segmented as being associated with a respective one of a plurality of marketing channels (block 3304). The market channels 708, for instance, may correspond to different avenues for consumption of the content 114, e.g., device type and so on. Accordingly, deployment data 122 corresponding to those channels may be "bucketed" in respective ones of the marketing channels 708.

The content is rated based on usage within respective ones of the plurality of marketing channels (block 3306). The ratings, for instance, may be based on the usage of the content 114 within the channel 708. The ratings may also be based on metadata 206 associated with the content, such as to describe commonalities such as characteristics of the content, environmental conditions, and so forth.

The ratings of the content are exposed that are usable to select respective content for inclusion with a marketing activity based on identification of one or more of the plurality of marketing channels that are associated with a respective potential consumer that is to receive the marketing activity (block 3308). The content deployment service 104, for instance, may receive a request 714 that identifies a particular marketing channel 708. The ratings 712 may then be used to select content have the highest likelihood of being of interest for that marketing channel, which then may be included with the marketing activity 716 as described above.

FIG. 34 depicts a procedure 3400 in an example implementation in which an activity stream is employed that is used to display comments and markups to content. Interaction of one or more users with content available via a shared network resource is monitored (block 3402). The users, for instance, may interact with content via a shared network resource 804 maintained by a third-party sharing service 802, a content deployment service 104, synchronized between the two, and so forth.

Comments and markups made in association with the content as part of the monitored interaction are collected (block 3406). As shown in FIGS. 16, 19, and 23, comments may be made in conjunction with markups of the content, image editing operations, and so forth.

A user interface is exposed for display that includes the content and the markups in which at least one of the markups is disposed over a display of the content and an activity stream that includes the collected comments (block 3406). The user interface may include an activity stream 1802 that includes the comments and markups that have been collected in real time for users that have been granted access to the shared network resource 804. A variety of other examples are also contemplated, such as to incorporate tasks 810 as part of a workflow 808 associated with a marketing activity 806 of the shared network resource 804 as described above.

Example System and Device

Figure 35:
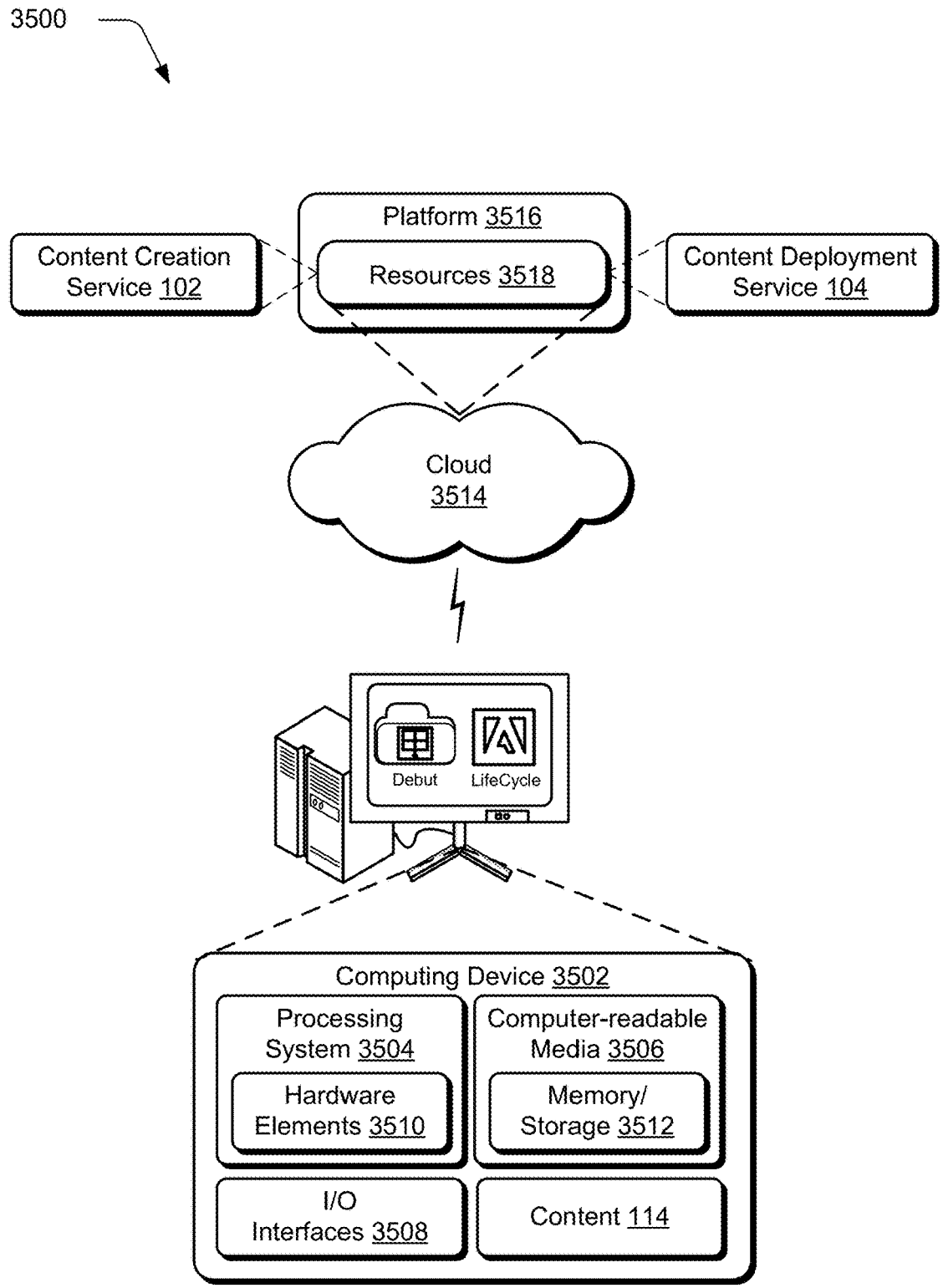
FIG. 35 illustrates an example system including various components of an example device that can be implemented as any type of computing device as described and/or utilize with reference to FIGS. 1-34 to implement embodiments of the techniques described herein.

FIG. 35 illustrates an example system generally at 3500 that includes an example computing device 3502 that is representative of one or more computing systems and/or devices that may implement the various techniques described herein. This is illustrated through inclusion of the content creation service 102, the content deployment service 104, and content 114. The computing device 3502 may be, for example, a server of a service provider, a device associated with a client (e.g., a client device), an on-chip system, and/or any other suitable computing device or computing system.

The example computing device 3502 as illustrated includes a processing system 3504, one or more computer-readable media 3506, and one or more I/O interface 3508 that are communicatively coupled, one to another. Although not shown, the computing device 3502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3504 is representative of functionality to perform one or more operations using hardware. Accordingly, the processing system 3504 is illustrated as including hardware element 3510 that may be configured as processors, functional blocks, and so forth. This may include implementation in hardware as an application specific integrated circuit or other logic device formed using one or more semiconductors. The hardware elements 3510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3506 is illustrated as including memory/storage 3512. The memory/storage 3512 represents memory/storage capacity associated with one or more computer-readable media. The memory/storage component 3512 may include volatile media (such as random access memory (RAM)) and/or nonvolatile media (such as read only memory (ROM), Flash memory, optical disks, magnetic disks, and so forth). The memory/storage component 3512 may include fixed media (e.g., RAM, ROM, a fixed hard drive, and so on) as well as removable media (e.g., Flash memory, a removable hard drive, an optical disc, and so forth). The computer-readable media 3506 may be configured in a variety of other ways as further described below.

Input/output interface(s) 3508 are representative of functionality to allow a user to enter commands and information to computing device 3502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 3502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 3502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 3510 and computer-readable media 3506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3510. The computing device 3502 may be configured to implement particular instructions and/or functions corresponding to the software and/or hardware modules. Accordingly, implementation of a module that is executable by the computing device 3502 as software may be achieved at least partially in hardware, e.g., through use of computer-readable storage media and/or hardware elements 3510 of the processing system 3504. The instructions and/or functions may be executable/operable by one or more articles of manufacture (for example, one or more computing devices 3502 and/or processing systems 3504) to implement techniques, modules, and examples described herein.

The techniques described herein may be supported by various configurations of the computing device 3502 and are not limited to the specific examples of the techniques described herein. This functionality may also be implemented all or in part through use of a distributed system, such as over a "cloud" 3514 via a platform 3516 as described below.

The cloud 3514 includes and/or is representative of a platform 3516 for resources 3518. The platform 3516 abstracts underlying functionality of hardware (e.g., servers) and software resources of the cloud 3514. The resources 3518 may include applications and/or data that can be utilized while computer processing is executed on servers that are remote from the computing device 3502. Resources 3518 can also include services provided over the Internet and/or through a subscriber network, such as a cellular or Wi-Fi network.

The platform 3516 may abstract resources and functions to connect the computing device 3502 with other computing devices. The platform 3516 may also serve to abstract scaling of resources to provide a corresponding level of scale to encountered demand for the resources 3518 that are implemented via the platform 3516. Accordingly, in an interconnected device embodiment, implementation of functionality described herein may be distributed throughout the system 3500. For example, the functionality may be implemented in part on the computing device 3502 as well as via the platform 3516 that abstracts the functionality of the cloud 3514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for creating and deploying at least one item of digital content, a system comprising:
   a content creation service system implemented by a processing system and a computer readable storage medium of at least one computing device the content creation service system including functionality that is accessible to content creators via a network to create the at least one item of digital content; and
   a content deployment service system implemented by the processing system and the computer readable storage medium of the at least one computing device, the content deployment service system configured to:
      receive the at least one item of digital content having associated data, the associated data including metadata describing characteristics of the at least one item of digital content, the data further describing a device type via which the at least one item of digital content is to be deployed and a type of communication to be used to communicate the at least one item of digital content;
      search a data storage that includes a plurality of other digital content by comparing the data of the at least one item of digital content with data of the plurality of other digital content;
      identify instances of the plurality of other digital content deployed on the device type and with the type of communication to be used to communicate the at least one item of digital content;
      select an instance of the plurality of other digital content from the identified instances with a highest weighting value for the device type and type of communication to be used to communicate the at least one item of digital content, the weighting value generated based on data indicating past performance of respective instances of the plurality of other digital content as previously deployed on the device type and using the type of communication to be used to communicate the at least one item of digital content;
      generate a suggestion of a change to be made to at least one of the characteristics of the at least one item of digital content based on a comparison of the instance of the plurality of other digital content with the at least one item of digital content; and
      display, in a user interface, the suggestion of the change to be made to the at least one of the characteristics of the at least one item of digital content.

2. A system as described in claim 1, wherein the metadata of the at least one item of digital content also describes characteristics of a device used to create the digital content.

3. A system as described in claim 1, wherein the suggestion of a change to be made to at least one of the characteristics of the at least one item of digital content is further based on deployment data that describes how and when the plurality of other digital content is accessed.

4. A system as described in claim 3, wherein the described characteristics of the at least one item of digital content include identification of one or more objects in the digital content or scene classification.

5. A system as described in claim 1, wherein the metadata of the at least one item of digital content also describes environmental conditions of a scene in which the at least one item of digital content is captured, the environmental conditions including a scene classification, lighting conditions, or whether the environment is likely indoors or outdoors.

6. A system as described in claim 1, wherein the suggestion of a change to be made to at least one of the characteristics of the at least one item of digital content is further based on deployment data that describes a number of times the plurality of other digital content is accessed.

7. In a digital medium environment for creating and deploying at least one item of digital content, a method implemented by a client device comprising:
   accessing a content creation service system via a network to create the at least one item of digital content, the content creation service system implemented by one or more computing devices;
   causing the content to be communicated by the content creation service to a content deployment service system, the content deployment service system configured to:
      receive the at least one item of digital content having associated data, the associated data including metadata describing characteristics of the at least one item of digital content, the data further describing a device type via which the at least one item of digital content is to be deployed and a type of communication to be used to communicate the at least one item of digital content;
      search a data storage that includes a plurality of other digital content by comparing the data of the at least one item of digital content with data of the plurality of other digital content;
      identify instances of the plurality of other digital content deployed on the device type and with the type of communication to be used to communicate the at least one item of digital content;
      select an instance of the plurality of other digital content from the identified instances with a highest weighting value for the device type and type of communication to be used to communicate the at least one item of digital content, the weighting value generated based on data indicating past performance of respective instances of the plurality of other digital content as previously deployed on the device type and using the type of communication to be used to communicate the at least one item of digital content;
      generate a suggestion of a change to be made to at least one of the characteristics of the at least one item of digital content based on a comparison of the instance of the plurality of other digital content with the at least one item of digital content; and
      display, in a user interface, the suggestion of the change to be made to the at least one of the characteristics of the at least one item of digital content.

8. A method as described in claim 7, wherein the suggestion of a change to be made to at least one of the characteristics of the at least one item of digital content if further based on deployment data that describes a number of times the plurality of other digital content is accessed.

9. A method as described in claim 8, wherein the deployment data further describes how and when the plurality of other digital content is accessed.

10. A method as described in claim 8, wherein the characteristics of the at least one item of digital content include characteristics of a device used to capture the at least one item of digital content, the characteristics including one or more of device type, flash usage, focal length, aperture values, exposure time, zoom level, digital versus analog zoom, lens type, or device identifier.

11. A method as described in claim 7, wherein the metadata of the at least one item of digital content identifies one or more applications used to create the digital content.

12. In a digital medium environment for creating and deploying at least one item of digital content, a system comprising one or more modules implemented at least partially in hardware, the one or more modules configured to perform operations comprising:
  receiving the at least one item of digital content having associated data, the associated data including metadata describing characteristics of the at least one item of digital content, the data further describing a device type via which the at least one item of digital content is to be deployed and a type of communication to be used to communicate the at least one item of digital content;
  searching a data storage that includes a plurality of other digital content by comparing the data of the at least one item of digital content with data of the plurality of other digital content;
  identifying instances of the plurality of other digital content deployed on the device type and with the type of communication to be used to communicate the at least one item of digital content;
  selecting an instance of the plurality of other digital content from the identified instances with a highest weighting value for the device type and type of communication to be used to communicate the at least one item of digital content, the weighting value generated based on data indicating past performance of respective instances of the plurality of other digital content as previously deployed on the device type and using the type of communication to be used to communicate the at least one item of digital content;
  generating a suggestion of a change to be made to at least one of the characteristics of the at least one item of digital content based on a comparison of the instance of the plurality of other digital content with the at least one item of digital content; and
  displaying, in a user interface, the suggestion of the change to be made to the at least one of the characteristics of the at least one item of digital content.

13. A system as described in claim 12, wherein the metadata of the at least one item of digital content also describes characteristics of a device used to create the at least one item of digital content.

14. A system as described in claim 12, wherein the metadata of the at least one item of digital content further indicates characteristics of a device used to capture the at least one item of digital content, the characteristics including one or more of device type, flash usage, focal length, aperture value, exposure time, zoom level, digital versus analog zoom, lens type, or device identifier.

15. A system as described in claim 12, wherein the suggestion of a change to be made to at least one of the characteristics of the at least one item of digital content is further based on deployment data that describes how and when the plurality of other digital content is accessed.

16. A system as described in claim 12, wherein the metadata of the at least one item of digital content further identifies one or more applications used to create the at least one item of digital content.

17. A system as described in claim 12, wherein the suggestion of a change to be made to at least one of the characteristics of the at least one item of digital content is further based on deployment data that describes a number of times the plurality of other digital content is accessed.

18. A system as described in claim 1, wherein the data indicating past performance of respective instances of the plurality of other digital content further indicates how the respective instances of the plurality of other digital content performed on a mobile device versus a desktop device.

19. A system as described in claim 1, wherein the data indicating past performance of respective instances of the plurality of other digital content further indicates how the respective instances of the plurality of other digital content performed as delivered on different types of delivery media.

20. A method as described in claim 7, wherein the data indicating past performance of respective instances of the plurality of other digital content further indicates how the respective instances of the plurality of other digital content performed on a mobile device versus a desktop device.

* * * * *